(12) United States Patent
El-Malki et al.

(10) Patent No.: US 8,507,404 B2
(45) Date of Patent: Aug. 13, 2013

(54) REGENERABLE SULFUR TRAPS FOR ON-BOARD VEHICLE APPLICATIONS

(75) Inventors: El-Mekki El-Malki, Falls Church, VA (US); Walter Weissman, Basking Ridge, NJ (US); Paul J. Polini, Rahway, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1022 days.

(21) Appl. No.: 12/082,351

(22) Filed: Apr. 10, 2008

(65) Prior Publication Data

US 2008/0307779 A1    Dec. 18, 2008

Related U.S. Application Data

(63) Continuation-in-part of application No. 11/179,372, filed on Jul. 12, 2005, now Pat. No. 7,389,638.

(60) Provisional application No. 60/922,844, filed on Apr. 11, 2007.

(51) Int. Cl.
*B01J 23/00* (2006.01)
*B01J 21/00* (2006.01)
*B01J 20/00* (2006.01)

(52) U.S. Cl.
USPC ............ 502/302; 502/20; 502/63; 502/64; 502/65; 502/66; 502/73; 502/74; 502/87; 502/216; 502/222; 502/223; 502/240; 502/245; 502/260; 502/263; 502/300; 502/303; 502/304; 502/324; 502/328; 502/330; 502/331; 502/332; 502/336; 502/338; 502/344; 502/345; 502/346; 502/347; 502/348; 502/349; 502/350; 502/351; 502/355; 502/415; 502/439; 502/514; 502/517

(58) Field of Classification Search
USPC ............... 502/63–66, 73, 74, 87, 240, 245, 502/260, 263, 300, 302–304, 324, 328, 330–332, 502/336, 338, 344–351, 355, 415, 439, 20, 502/216, 222, 223, 514, 517; 423/45, 52, 423/82, 242.1, 243.07, 244.01, 244.06, 244.09, 423/244.1
See application file for complete search history.

(56) References Cited

U.S. PATENT DOCUMENTS

| | | | | |
|---|---|---|---|---|
| 3,658,724 A | * | 4/1972 | Stiles | 502/183 |
| 4,018,710 A | * | 4/1977 | Oshimura et al. | 502/223 |
| 4,157,987 A | * | 6/1979 | Dolhyj et al. | 502/209 |
| 4,600,541 A | * | 7/1986 | Aoki et al. | 558/321 |
| 4,767,733 A | * | 8/1988 | Chester et al. | 502/65 |
| 4,873,216 A | * | 10/1989 | Absil et al. | 502/211 |
| 5,128,306 A | * | 7/1992 | Dettling et al. | 502/304 |
| 5,502,019 A | * | 3/1996 | Augustine et al. | 502/314 |
| 5,688,736 A | * | 11/1997 | Seamans et al. | 502/219 |
| 6,107,239 A | * | 8/2000 | Qin et al. | 502/300 |
| 6,458,741 B1 | * | 10/2002 | Roark et al. | 502/303 |
| 6,770,251 B2 | * | 8/2004 | Yoshikawa | 423/239.1 |
| 6,875,409 B1 | * | 4/2005 | Zhou et al. | 423/239.1 |
| 7,021,049 B2 | * | 4/2006 | Berris et al. | 60/295 |
| 7,030,054 B2 | * | 4/2006 | Chigapov et al. | 502/302 |
| 7,053,022 B2 | * | 5/2006 | Gaffney et al. | 502/312 |
| 7,166,263 B2 | * | 1/2007 | Vanderspurt et al. | 423/263 |
| 7,179,442 B2 | * | 2/2007 | Hagemeyer et al. | 423/655 |
| 7,235,507 B2 | * | 6/2007 | Xu et al. | 502/63 |
| 7,402,547 B2 | * | 7/2008 | Wellington et al. | 502/222 |
| 7,612,011 B2 | * | 11/2009 | Vanderspurt et al. | 502/302 |
| 7,871,957 B2 | * | 1/2011 | Willigan et al. | 502/304 |
| 2002/0114746 A1 | * | 8/2002 | Roark et al. | 422/177 |
| 2002/0150516 A1 | * | 10/2002 | Pahlman et al. | 422/171 |
| 2002/0168302 A1 | * | 11/2002 | Pahlman et al. | 422/171 |
| 2002/0173420 A1 | * | 11/2002 | Cantrell et al. | 502/150 |
| 2002/0182134 A1 | * | 12/2002 | Wu et al. | 423/239.1 |
| 2003/0049191 A1 | * | 3/2003 | Twigg | 423/244.07 |
| 2003/0100446 A1 | * | 5/2003 | Hase et al. | 502/302 |
| 2003/0157008 A1 | * | 8/2003 | Pahlman et al. | 423/239.1 |
| 2003/0166987 A1 | * | 9/2003 | Roark | 588/205 |
| 2003/0186804 A1 | * | 10/2003 | Wagner et al. | 502/300 |
| 2004/0106837 A1 | * | 6/2004 | Lampert et al. | 585/820 |
| 2004/0147394 A1 | * | 7/2004 | Wagner et al. | 502/325 |
| 2004/0170558 A1 | | 9/2004 | Hershkowitz | |
| 2004/0170559 A1 | | 9/2004 | Hershkowitz et al. | |
| 2004/0175326 A1 | | 9/2004 | Hershkowitz et al. | |
| 2004/0180973 A1 | | 9/2004 | Hershkowitz | |

| | | | |
|---|---|---|---|
| 2004/0187483 | A1 | 9/2004 | Dalla Betta et al. |
| 2004/0191166 | A1 | 9/2004 | Hershkowitz et al. |
| 2004/0241505 | A1 | 12/2004 | Hershkowitz et al. |
| 2005/0096215 | A1* | 5/2005 | Espinoza et al. .............. 502/302 |
| 2005/0169826 | A1* | 8/2005 | Li et al. .................... 423/244.06 |
| 2006/0100097 | A1* | 5/2006 | Chigapov et al. ............. 502/304 |
| 2006/0217264 | A1* | 9/2006 | Brazdil et al. ................ 502/321 |

FOREIGN PATENT DOCUMENTS

| | | |
|---|---|---|
| EP | 0904482 B1 | 1/2001 |
| EP | 1374978 A1 | 1/2004 |
| EP | 1634638 A2 | 3/2006 |
| EP | 1645325 A2 | 4/2006 |
| EP | 1683574 A1 | 7/2006 |
| JP | 08-192051 A | 7/1996 |
| WO | WO 2004/078644 A1 | 9/2004 |

OTHER PUBLICATIONS

Brian West, et al., "Assessing Reductant Chemistry During In-Cylinder Regeneration of Diesel Lean Nox Traps", SAE Technical Paper Series #2004-01-3023.

L. Bromberg et al., "Onboard Plasmatron Generation of Hydrogen rich Gas for Diesel Engine Exhaust Aftertreatment and Other Applications".

\* cited by examiner

*Primary Examiner* — Cam N. Nguyen

(74) *Attorney, Agent, or Firm* — Robert A. Migliorini; David M. Weisberg

(57) ABSTRACT

Provided are improved regenerable $SO_x$ trap formulations for on-board vehicle applications. The regenerable sulfur trap formulations reduce the rate of sulfur poisoning of a downstream nitrogen storage reduction (NSR) catalyst trap in exhaust gas cleaning systems for combustion engines by adsorbing $SO_x$ as metal sulfate under lean exhaust conditions and desorbing the accumulated $SO_x$ under rich exhaust conditions. The regenerable sulfur oxides trap catalyst compositions include a metal (M) oxide, wherein M is selected from Cu, Fe, Mn, Ag, Co and combinations thereof and a metal (M)-La—Zr oxide, wherein M is selected from Cu, Fe, Mn, Ag, Co and combinations thereof. In addition, provided are improved exhaust gas cleaning systems and methods for treating exhaust gas from a combustion source that include a hydrogen generation system, a regenerable sulfur oxides trap, and a regenerable nitrogen storage reduction (NSR) catalyst trap. The improved exhaust gas cleaning systems and methods allow for the sulfur released from the sulfur trap to pass through the nitrogen oxide trap with no or little poisoning of $NO_x$ storage and reduction sites, which significantly improves NSR catalyst trap lifetime and performance to meet future emissions standards. The disclosed exhaust gas cleaning systems are suitable for use in internal combustion engines (e.g., diesel, gasoline, CNG) which operate with lean air/fuel ratios over most of the operating period.

5 Claims, 20 Drawing Sheets

US 8,507,404 B2

REGENERABLE SULFUR TRAPS FOR ON-BOARD VEHICLE APPLICATIONS

CROSS-REFERENCE TO RELATED APPLICATIONS

This application claims the benefit of U.S. Provisional Application 60/922,844 filed on Apr. 11, 2007, and is a Continuation-in-Part of U.S. application Ser. No. 11/179,372 filed on Jul. 12, 2005, now U.S. Pat. No. 7,389,638, both of which are herein incorporated by reference.

FIELD

The present disclosure relates to the field of exhaust gas cleaning systems for combustion engines. It more particularly relates to an improved process for operating an exhaust gas treatment unit consisting of a hydrogen rich gas source, a sulfur ($SO_x$) catalyst trap and a nitrogen oxide ($NO_x$) storage reduction (NSR) catalyst trap. Still more particularly, the present disclosure relates to a process based on using a $H_2$ gas rich to enable the sulfur released from the sulfur ($SO_x$) trap to pass through a $NO_x$ storage reduction (NSR) catalyst trap with no poisoning of the $NO_x$ storage and reduction components. Still yet more particularly, the present disclosure relates to improved SOx trap compositions that adsorb SOx as metal sulfates under lean exhaust conditions and desorb accumulated SOx by reduction of metal sulfate under rich exhaust conditions.

BACKGROUND

In Japan, the $NO_x$ storage reduction (NSR) catalyst also known as $NO_x$ trap or $NO_x$ adsorbent is a demonstrated after treatment technology for control of HC, CO, and $NO_x$ on vehicles equipped with lean burn gasoline engines. This catalyst provides two key functions. When the engine operates with a stoichiometric air/fuel ratio, it functions as a standard three-way conversion catalyst. Under lean operating conditions, while CO and HC in the exhaust are combusted, the NSR catalyst trap functions as a trap for $NO_x$ ($NO+NO_2$). The reaction mechanism of $NO_x$ storage and reduction over a NSR catalyst trap are depicted in Equations 1-4. In general, a NSR catalyst trap should exhibit both oxidation and reduction functions. In a lean environment, NO is oxidized to $NO_2$ (Equation 1). This reaction is catalyzed by a noble metal (e.g., Pt). Further oxidation of $NO_2$ to nitrate, with incorporation of an atomic oxygen occurs. The nitrate is then stored over selected metal components (Equation 2). To ensure continuous and lasting $NO_x$ control, the NSR catalyst trap requires periodic regeneration with controlled short, rich pulses, which serve to release (Equation 3) and reduce the stored $NO_x$ (Equation 4). Again a Pt group metal is used for $NO_x$ release and reduction. Poisoning of the NSR catalyst trap by sulfur oxides takes place in principle in the same way as the storage of nitrogen oxides. The sulfur dioxide emitted by the engine is oxidized to sulfur trioxide on the catalytically active noble metal component (e.g., Pt) of the NSR catalyst trap (Equation 5). Sulfur trioxide ($SO_3$) reacts with the storage materials (e.g., Ba) in the NSR catalyst trap with the formation of the corresponding sulfates (Equation 6). Because of the low capacity of the trap to hold sulfur before activity falls and of the stability of sulfate poisons, frequent high temperature desulfations under fuel rich conditions are required (>650° C.). This stresses the thermal stability of the NSR catalyst trap and ultimately results in a significant fuel penalty as a result of running a fuel rich mixture as required for high temperature desulfations. This correspondingly shortens NSR catalyst trap life.

Equations:

| | |
|---|---|
| (1) $NO + \frac{1}{2}O_2 = NO_2$ | Oxidation of NO to $NO_2$ |
| (2) $2NO_2 + MCO_3 + \frac{1}{2}O_2 = M(NO_3)_2 + CO_2$ | $NO_x$ Storage as Nitrate |
| (3) $M(NO_3)_2 + 2CO = MCO_3 + NO_2 + NO + CO_2$ | $NO_x$ release: |
| (4) $NO + NO_2 + 3CO = N_2 + 3CO_2$ | $NO_x$ reduction to $N_2$ |
| (5) $SO_2 + \frac{1}{2}O_2 = SO_3$ | $SO_x$ poisoning Process |
| (6) $SO_3 + MCO_3 = MSO_4 + CO_2$ | $SO_x$ poisoning Process |

In equations 2, 3 and 6, M represents a divalent base metal cation (e.g., Ba). M can also be a monovalent or trivalent metal compound, in which case the equations need to be rebalanced.

One method for decreasing the formation of sulfates that poison the NSR catalyst trap is to provide a $SO_x$ trap upstream of the NSR catalyst trap which undergoes a continuous sulfur uptake and release as a function of the air/fuel ratio (A/F ratio). By periodically changing the exhaust gas conditions from lean to rich, the sulfates stored on sulfur trap are decomposed to yield sulfur species, and the nitrates stored on the NSR catalyst trap are reduced to nitrogen. Key requirements are that a substantial fraction of sulfur species released pass through the NSR catalyst trap with no poisoning of the $NO_x$ storage (e.g., Ba) and reduction components (e.g., Pt).

EP 0582917 A1 discloses that the poisoning of a storage catalyst with sulfur can be reduced by a sulfur trap inserted into the exhaust gas stream upstream of the storage catalyst. Alkali metals (potassium, sodium, lithium and cesium), alkaline earth metals (barium and calcium), and rare earth metals (lanthanum and yttrium) are disclosed as storage materials for the sulfur trap. The sulfur trap also includes platinum (Pt) as a catalytically active component. However the disadvantage of the embodiments in EP 0582917 A1 is that the sulfur storage capacity is limited, unless an inordinately large trap is provided or the trap is replaced at very frequent intervals. Once the sulfur trap reaches its full storage capacity sulfur oxides contained in the exhaust gas will pass through the sulfur trap and poison the NSR catalyst trap.

EP 0625633 discloses an improvement to the design disclosed in EP 0582917 by also providing a sulfur trap just upstream of the NSR catalyst in the exhaust gas stream of the internal combustion engine. The combination of sulfur trap and NSR catalyst is operated in such way that sulfur oxides are stored on the sulfur trap and nitrogen oxides are stored on the NSR catalyst under lean exhaust conditions. By periodically changing the exhaust gas conditions from lean to rich, the sulfates stored on sulfur trap are decomposed to yield sulfur dioxide, and the nitrates stored on the NSR catalyst are decomposed to yield nitrogen dioxide. EP 0625633 also discloses a further improvement by highly enriching the exhaust gas to release nitrogen oxides from the nitrogen oxide catalyst and only slightly enriching the exhaust gas to release the sulfur oxides from the sulfur oxide trap. The quantities of sulfur oxides contained in the exhaust gas from an internal combustion engine are much smaller than the quantities of nitrogen oxides, and therefore, it is not necessary to also remove sulfur from the sulfur oxide trap each time the nitrogen oxides are released from the storage catalyst. The period of the cycle for releasing nitrogen oxides from the NSR catalyst is about one minute, whereas the period for releasing from the sulfur trap is several hours according to EP 0582917.

U.S. Pat. No. 5,473,890 discloses a $SO_x$ trap composition selected from alkali, alkali-earth, and rare earth metals. Pt is also added to this formulation. High temperature regeneration (>650° C.) is needed for such a system, which is not a practical solution since this will result in thermal damage to this trap and the NSR unit in the same flow line, which is also shown operated in the same flow line at this temperature. U.S. Pat. No. 5,473,890 refers to a $SO_x$ trap containing at least one member selected from copper, iron, manganese, nickel sodium, titanium, lithium and titania. In addition Pt is added to the catalyst. Pt containing adsorbents result in significant quantities of $H_2S$ release under rich conditions, which will react with sulfur trap components forming stable metal sulfide leading to only a partial regeneration of $SO_x$ trap. The authors did not show any test activity for the system.

U.S. Pat. No. 5,687,565 discloses a very complex oxide composition, selected from alkaline earth oxides (Mg, Ca, Sr, Ba, Zn). In addition Cu and noble metals (Pt, Pd, Ru) were also added. Again such a system is unpractical as a regenerable $SO_x$ trap due to the need for 650° C.+ regeneration and the poisoning effects of $H_2S$ release.

U.S. Pat. No. 5,792,436 discloses $SO_x$ traps containing alkaline earth metal oxides selected from Mg, Ca, Sr, Ba in combination with oxides of cerium and a group of elements of atomic numbers from 22 to 29. Pt is also added to the catalysts formulation. Again such a system requires high temperatures to regenerate (>650° C.).

EP 1374978 A1 discloses $SO_x$ traps containing oxides of copper. The authors indicate that the system can be regenerated at low temperature (250-400° C.) depending on the support. However, the authors did not show any data on the effect of the released sulfur species (e.g., $SO_2$) on NSR catalyst trap. As will be discussed later, the released $SO_2$ at these low temperatures will poison NSR reduction sites under rich conditions.

U.S. Pat. No. 6,145,303 discloses $H_2S$ formation under rich conditions, and a method to suppress it when the air/fuel ratio is close to stoichiometry. This approach to suppress $H_2S$ formation translates into a partial and a long regeneration period of the sulfur trap. Moreover, a higher temperature is needed for desulfation, which can also stress the thermal stability of the sulfur trap.

WO 0156686 discloses that the release of sulfur under rich conditions leads to the adsorption of sulfur species on NSR. Also disclosed is that such sulfur adsorption will affect the NSR catalyst trap and a high temperature desulfation procedure of the NSR catalyst trap is needed.

The aforementioned methods for operating an exhaust gas treatment unit consisting of a sulfur trap and a nitrogen oxides storage reduction catalyst have two distinct disadvantages. The first disadvantage is the absence of a procedure to transmit sulfur species through NSR catalyst trap with no poisoning of $NO_x$ storage and reduction sites. The second disadvantage is that most of the reported sulfur traps contain Pt and are partially regenerated at high temperatures releasing $H_2S$ as main product. In addition $H_2S$ may be an issue for future regulation and needs to be controlled.

A need exists for an improved process for operating an exhaust gas treatment unit including a sulfur trap and a NSR catalyst trap operated in tandem. The system will ideally have a $SO_x$ trap regenerable at moderate temperatures (~400-600° C.) by use of a regeneration gas media that can enable the sulfur species released from sulfur trap to pass through the NSR catalyst trap with no poisoning of $NO_x$ storage and catalytic components. A need also exists to further optimize the catalyst and catalyst support materials for use in the sulfur trap to provide broader operating windows during $SO_x$ adsorption and desorption.

SUMMARY

Provided are sulfur trap compositions, exhaust gas cleaning systems and methods for treating exhaust gases from a combustion source. More particularly, provided are methods for passing sulfur species (e.g. $SO_2$, $H_2S$, COS or mixture formed during regeneration of SOx trap) through a NSR catalyst without, or with minimal poisoning of NSR catalyst sites (e.g. Pt and $BaCO_3$ sites) under rich conditions at a controlled temperature window (e.g. 400 to 575° C.) and in presence of controlled amount of $H_2$.

According to one aspect of the present disclosure, a regenerable sulfur oxides trap catalyst composition for trapping $SO_x$ from a combustion source comprises a metal (M) oxide/support, wherein M is selected from Cu, Fe, Mn, Ag, Co, Ce, Zr and combinations thereof, and wherein the metal oxide is on a catalyst support (S), wherein S is selected from an oxide of alumina, stabilized gamma alumina with rare earth components, MCM-41, zeolites, silica, magnesium, zirconia, ceria, ceria-zirconia, titania, titania-zirconia, and combinations thereof.

Another aspect of the present disclosure relates to a regenerable sulfur oxides trap catalyst composition for trapping $SO_x$ from a combustion source comprising a mixed metal (M)-La—Zr oxide, wherein M is selected from Cu, Fe, Mn, Ag, Co, Ce and combinations thereof.

Another aspect of the present disclosure relates to a regenerable sulfur oxides trap catalyst composition for trapping $SO_x$ from a combustion source comprising a metal oxide, wherein the metal oxide is selected from Ce—Zr oxide, Ce—Fe oxide Pt—Ba oxide, and combinations thereof.

A further aspect of the present disclosure relates to an exhaust gas cleaning system for a combustion source comprising: a) a $H_2$ rich gas generator system, b) a regenerable sulfur oxides trap, and c) a regenerable nitrogen storage reduction (NSR) catalyst trap, wherein the sulfur oxides trap comprises a catalyst selected from Ce—Zr oxide, Ce—Fe oxide, Mn—La—Zr oxide, Fe—La—Zr oxide, Cu—La—Zr oxide, Co—La—Zr oxide, Pt—Ba oxide, Pt, and combinations thereof, wherein the NSR catalyst trap is positioned downstream of the sulfur oxides trap and the $H_2$ rich gas generator system, wherein the sulfur oxides trap releases sulfur atom species during regeneration under a rich fuel to air ratio condition to the downstream NSR catalyst trap, wherein the NSR catalyst trap is at a temperature of from about 400 to about 600° C. in the presence of $H_2$ from the $H_2$ rich gas generator system, and at an atomic ratio of $H_2$ to the released sulfur atom species of greater than or equal to about 65 during regeneration of the sulfur oxides trap, and wherein the sulfur atom species released by the sulfur oxides trap pass through the NSR catalyst trap with no poisoning of the $NO_x$ storage and $NO_x$ reduction components.

Still another aspect of the present disclosure relates to a method for improving the treatment of exhaust gas comprising the steps of: i) providing a combustion source with an exhaust gas cleaning system comprising: a $H_2$ rich gas generator system, a regenerable sulfur oxides trap, and a regenerable nitrogen storage reduction (NSR) catalyst trap, wherein the sulfur oxides trap comprises a catalyst selected from Ce—Zr oxide, Ce—Fe oxide, Mn—La—Zr oxide, Fe—La—Zr oxide, Cu—La—Zr oxide, Co—La—Zr oxide, Pt—Ba oxide, Pt, and combinations thereof, wherein the NSR catalyst trap is positioned downstream of the sulfur oxides trap and the $H_2$ rich gas generator system, and ii) regenerating the sulfur oxides trap and the NSR catalyst trap with the $H_2$ rich gas and reductant rich exhaust generated by operation of the engine at greater than the stoichiometric fuel/air ratio, and iii) maintaining the NSR catalyst trap at a temperature of from about 400 to about 600° C. in the presence of $H_2$ from the $H_2$ rich gas generator system at an atomic ratio of $H_2$ to the released sulfur atom species of greater than or equal to about 65 during regeneration of the sulfur oxides trap, wherein the sulfur atom species released by the sulfur oxides trap pass through the NSR catalyst trap with no poisoning of the $NO_x$ storage and $NO_x$ reduction components.

Numerous advantages result from the advantageous regenerable sulfur trap catalyst compositions, exhaust gas cleaning systems and methods for improving the treatment of exhaust gas disclosed herein and the uses/applications therefore.

For example, in exemplary embodiments of the present disclosure, the disclosed exhaust gas cleaning system comprising a regenerable sulfur trap, a hydrogen source, and an NSR catalyst trap exhibits that sulfur released from the sulfur trap subsequently passes through the NSR catalyst trap in presence of low amount of $H_2$ with no poisoning of $NO_x$ storage and reduction components.

In a further exemplary embodiment of the present disclosure, the disclosed exhaust gas cleaning system comprising a regenerable sulfur trap, a hydrogen source, and an NSR catalyst trap exhibits improved durability of the NSR catalyst trap when positioned downstream of a sulfur trap.

In a further exemplary embodiment of the present disclosure, the disclosed exhaust gas cleaning system comprising a regenerable sulfur trap, a hydrogen source, and an NSR catalyst trap exhibits the ability to regenerate both the sulfur trap and the NSR catalyst trap at a temperature below 600° C. while avoiding thermal stress of the catalyst and the fuel penalty.

In a further exemplary embodiment of the present disclosure, the disclosed exhaust gas cleaning system comprising a regenerable sulfur trap, a hydrogen source, and an NSR catalyst trap exhibits improved NSR catalyst lifetime and performance.

In a further exemplary embodiment of the present disclosure, the disclosed exhaust gas cleaning system comprising a regenerable sulfur trap, a hydrogen source, and an NSR catalyst trap further includes a shift converter (water gas shift (WGS) catalyst) of improved catalyst composition to efficiently convert carbon monoxide to carbon dioxide and hydrogen without need for special catalyst reconditioning.

In a further exemplary embodiment of the present disclosure, the disclosed exhaust gas cleaning system comprising a regenerable sulfur trap, a hydrogen source, and an NSR catalyst trap includes a WGS catalyst of improved composition having increased activity in a shift conversion reactor for converting carbon monoxide to carbon dioxide and hydrogen without need to protect the WGS catalyst from lean conditions.

In a further exemplary embodiment of the present disclosure, the disclosed exhaust gas cleaning system comprising a regenerable sulfur trap, a hydrogen source, and an NSR catalyst trap includes a WGS catalyst of improved catalyst composition providing for improved activity and durability over existing catalyst for the water-gas-shift reaction.

These and other advantages, features and attributes of the disclosed regenerable sulfur trap compositions, exhaust gas cleaning systems and methods for treating exhaust gases from a combustion source of the present disclosure and their advantageous applications and/or uses will be apparent from the detailed description which follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
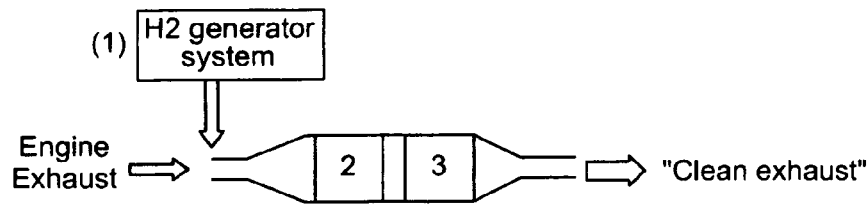
FIG. 1 depicts an illustrative schematic of a treatment unit for the exhaust gas from an engine according to the present disclosure. The exhaust gas treatment unit includes a $H_2$ rich gas generator system (1), a $SO_x$ trap (2) down-stream of the $H_2$ generator system (1), and a NSR catalyst trap (3) down-stream of the $SO_x$ trap (2).

The present disclosure relates to an improved sulfur trap compositions for trapping SO$_x$ from combustion sources, and their use in exhaust gas treatment systems and processes. The sulfur trap compositions are distinguishable over the prior art in providing novel regenerable compositions that provide broader operating windows during SO$_x$ adsorption and desorption. In addition, the exhaust gas treatment system and process disclosed herein are distinguishable over the prior art in comprising a combination of improved sulfur trap compositions (also referred to herein as a sulfur oxides trap or a SO$_x$ trap), a hydrogen source (also referred to herein as a hydrogen generator or generation system), and a nitrogen oxide trap (also referred to herein as a NO$_x$ trap, NO$_x$ adsorbent or NO$_x$ storage reduction (NSR) catalyst) which in combination advantageously decrease sulfur adsorption, and poisoning of the NSR catalyst trap. More particularly, the present disclosure relates to deployment of improved sulfur trap compositions in an improved system and method for operating an exhaust gas treatment unit including a sulfur trap, a hydrogen source, and a NSR catalyst trap, wherein the process is based on generating H$_2$ on-board the vehicle to enable the sulfur released from sulfur trap (SO$_2$, H$_2$S, COS) to pass through the NSR catalyst trap with no or little poisoning of NO$_x$ storage and reduction components. The improved method for operating an exhaust gas treatment unit may also optionally include the addition of a water gas shift catalyst trap, and a clean-up catalyst trap.

The present disclosure also provides a set of $SO_x$ trap compositions that adsorb $SO_x$ under a wide range of lean conditions and desorb $SO_x$ species under fuel rich conditions in presence of controlled amount of $H_2$ with the effluent being a compositional mixture that will pass through an NSR trap with minimal poisoning effects. More particularly, provided are $SO_x$ trap compositions that will only release adsorbed sulfur species under fuel rich conditions in the presence of a controlled amount of $H_2$ in a compositional mixture which will pass through an NSR trap with minimal poisoning effects when the temperature of the $SO_x$ trap is above 400° C. The operation of these new $SO_x$ trap compositions are provided upstream of and in combination with a $NO_x$ trap, wherein the released gaseous mixture from the $SO_x$ trap is exposed to the $NO_x$ trap at a controlled temperature window (400-575° C.).

The present disclosure also relates to methods for passing sulfur species ($SO_2$, $H_2S$, COS or mixture formed during regeneration of $SO_x$ trap) through the NSR catalyst without/or with minimal poisoning of NSR catalyst sites (e.g. Pt and $BaCO_3$ sites). More particularly, the methods include passing the sulfur species ($SO_2$, $H_2S$) through a NSR catalyst under rich conditions at a controlled temperature window (from about 400 to 575° C.), and in presence of a controlled amount of $H_2$. The methods also include passing the sulfur species ($SO_2$, $H_2S$) through the NSR catalyst under rich conditions at a controlled temperature window (about 400 to 575° C.) and controlling the molar ratio of $H_2$ to sulfur species (e.g. $H_2$/total sulfur species of about 50 or higher at 450° C.). However, this molar ratio may be lower at higher temperatures.

The methods disclosed herein for passing the sulfur species from the sulfur trap through the NSR catalyst trap are advantageous because they result in little to no change in NSR catalyst activity when the NSR catalyst temperature window (e.g. about 400 to 575° C.) and molar ratio of $H_2$ to sulfur species are controlled. In one exemplary embodiment, the temperature around the NSR catalyst may need to be increased if the $SO_x$ trap formulation may be regenerated at a lower temperature (e.g. below 400° C.). The temperature around the NSR catalyst may be increased either by adding external heating or by oxidation of reductants. On the other hand, in another exemplary embodiment, when the $SO_x$ trap regeneration occurs at high temperatures (e.g. >575° C.), then the temperature around the NSR catalyst may be controlled either by using a cooling system or by controlling the distance between NSR catalyst and $SO_x$ trap in the exhaust pipe.

The present disclosure also relates to improvements in an exhaust gas cleaning system, which operates with lean air/fuel ratios over most of the operating period. The exhaust gas treatment unit comprises a nitrogen oxides trap (NSR) catalyst and a sulfur trap located upstream of the nitrogen oxides trap. It has been discovered that the release of sulfur from a $SO_x$ trap as $SO_2$ or $H_2S$ in presence of moderate amounts of $H_2$ leads to no or a minimal adsorption of sulfur on the NSR catalyst trap when compared to the release of sulfur species in the presence of hydrocarbon (HC) and/or carbon monoxide (CO). This breakthrough will significantly improve the NSR catalyst trap lifetime and performance. This also permits sulfur regeneration to be carried out at moderate temperature (400-600° C.). In addition, any $H_2S$ formed will be trapped under rich conditions, using a clean-up catalyst trap downstream of the NSR catalyst trap, and released as $SO_2$ during lean conditions.

The advantageous effects of incorporating a sulfur trap within the exhaust system are exhibited by monitoring the resulting improved $NO_x$ adsorption efficiency. Reference made to the figures that follow show that the $NO_x$ storage over the NSR catalyst trap decreases following the release of sulfur species under a simulated rich exhaust containing $C_3H_6CO$ (see FIGS. 9, 10). On the other hand, $NO_x$ storage was not affected by the release of sulfur species in the presence of $H_2$ (see FIGS. 11, 12). In view of this contrast, a further advantage of the present system is that the durability of a NSR catalyst trap when positioned downstream of a sulfur trap can be considerably increased. Another advantage includes the ability to regenerate the sulfur trap and NSR catalyst trap at a temperature below 600° C., which can avoid the thermal stress of the catalyst and the corresponding fuel penalty. A further advantage of the present disclosure is improved control of hydrogen sulfide, hydrocarbons, and $NH_3$ emissions using a clean-up catalyst trap located just downstream of the NSR catalyst trap. These and other advantages will be evident from the detailed disclosure that follows.

The improved exhaust gas treatment unit of the present disclosure includes a hydrogen source, a sulfur trap (also referred to as a $SO_x$ trap or sulfur oxide trap), and a nitrogen oxides trap (NSR catalyst trap). In other exemplary embodiments of the present disclosure, the improved exhaust gas treatment system additionally includes various combinations of a water-gas-shift catalyst, a clean-up trap, and a diesel particulate collection system. The configuration of these components within the exhaust gas treatment unit may be varied as will be displayed by the embodiments which follow.

The hydrogen source for input to the exhaust gas treatment system may be produced on-board the vehicle by a variety of methods and devices or stored within a refillable reservoir on board the vehicle. An exemplary method of generating $H_2$ on-board the vehicle for input to the exhaust gas treatment system is using engine control approaches (in-cylinder injection of excess fuel, or rich combustion). Strategies for engine control employ intake throttling to lower exhaust oxygen concentration, then excess fueling is used to transition rich. For instance Delayed Extended Main (DEM) strategy uses intake throttling to lower Air/Fuel ratio then the main injection duration is extended to achieve rich conditions. On the other hand, a post injection involves adding an injection event after the main injection event to achieve rich operation. Both strategies lead to the conversion of fuel to a mixture of CO and $H_2$ (Brian West et al. SAE 2004-01-3023). The CO can further be converted to $H_2$ and $CO_2$ using a WGS catalyst. Another exemplary method consists on-board plasmatron generation of $H_2$ from hydrocarbon fuels as disclosed in U.S. Pat. No. 6,176,078. Other exemplary methods for generating $H_2$ utilize catalytic devices. For instance, $H_2$ can be produced by steam reforming in which a mixture of deionized water and hydrocarbon fuel are fed to a steam reformer mounted in a combustion chamber as disclosed in U.S. Pat. No. 6,176,078. Further exemplary catalytic devices of generating $H_2$ for input to the exhaust gas treatment system include, but are not limited to, autothermal reforming (ATR), pressure swing reforming (as disclosed in U.S. Patent Publication No. 20040170559 and 20041911166), and partial oxidation of hydrocarbon fuels with $O_2$ and $H_2O$ (WO patent 01/34950). The catalytic devices always produce a mixture of CO+$H_2$ and a WGS catalyst is needed to convert CO to $H_2$ and $CO_2$ in presence of water. Another possibility for generating $H_2$ is to use an electrolyzer as described in the literature (Heimrich et al. SAE 2000-01-1841). The electrolyzer produces hydrogen from the dissociation of water to hydrogen and oxygen (i.e., $H_2O=H_2+\frac{1}{2}O_2$). The produced hydrogen can be injected in the exhaust system or stored under relatively high pressure on-board the vehicle.

Another method of generating additional hydrogen in the exhaust system is to use a water-gas-shift (WGS) catalyst to convert CO (produced by the in-cylinder injection or by catalytic devices) in presence of water to $CO_2$ and $H_2$ by using suitable elements and supports for such. The overall reaction is as follows: $CO+H_2O=CO_2+H_2$ whereby $\Delta H=-41.2$ kj/mol, and $\Delta G=-28.6$ kj/mol. A commonly used catalyst for the WGS reaction is $CuO-ZnO-Al_2O_3$ based catalyst (U.S. Pat. No. 4,308,176). However, the performance of the catalyst to effect carbon monoxide conversion and the hydrogen yield gradually decrease during normal operations due to deactivation of the catalyst. In addition because of the sensitivity of this catalyst to air and condensed water, there is a reason not to use them for an automotive fuel processing devices.

Metal-promoted ceria catalysts have been tested as water-gas-shift catalysts (T. Shido et al, J. Catal. 141 (1994) 105; J. T. Kummer, J. Phys. Chem. 90 (1986) 4747). The combination of ceria and platinum provide a catalyst that is more oxygen tolerant than earlier known catalysts. Moreover, ceria is known to play a crucial role in automotive, three-way, emissions-control because of its oxygen-storage capacity (H. C. Yao et al. J. Catal. 86 (1984) 254). Deactivation of the oxygen storage capacity of ceria by high temperatures in automotive applications is well known, and it is necessary to stabilize the reducibility of ceria for that application by mixing it with zirconia (Shelef et al. "Catalysis by Ceria and related Materials", Imperial College press, London 2002, p. 243).

The improved catalyst composition for the WGS of the present disclosure used in the shift converter comprises a noble metal catalyst having a promoting support. The support comprises a mixed metal oxide of at least cerium oxide and zirconium oxide. The zirconia increases the resistance of ceria to sintering, thereby improving the durability of the catalyst composition. Additionally, alumina may be added to the catalyst composition to improve its suitability for washcoating onto a monolithic substrate. An exemplary combination of catalyst element and support material of the present disclosure for a WGS catalyst is Pt supported on ceria, Pt supported on ceria-zirconia, Rh supported on ceria, Rh supported on ceria-zirconia, or combinations thereof.

The present disclosure further includes a sulfur ($SO_x$) trap upstream of WGS catalyst to protect the WGS and the NSR trap from sulfur poisoning under lean conditions. The release of sulfur species will occur in the temperature range of 400-600° C. to avoid any adsorption of sulfur species on NSR. The sulfur ($SO_x$) trap may be prepared by using known techniques for the preparation of vehicle exhaust gas catalysts. The sulfur trap includes a catalyst composition suitable for adsorbing $SO_x$ as metal sulfate under lean (oxidative) conditions and desorbing accumulated sulfate as $SO_2$ by reduction of metal sulfate under rich (reducing) conditions. The composition of the sulfur trap is further designed to prevent sulfur poisoning of after treatment devices, and especially the NSR catalyst trap. The sulfur oxide trap elements are selected based on their ability to release sulfur at low temperatures ($\leq 575°$ C.) under rich exhaust conditions.

Suitable sulfur ($SO_x$) traps are selected from oxides of copper, iron, cobalt, silver, manganese, tin, ceria, zirconia, lithium, titania and combinations thereof. The aforementioned $SO_x$ adsorbent materials may be used as mixed metal oxides or supported on alumina, stabilized gamma alumina, silica, MCM-41, zeolites, titania, and titania-zirconia, The support material may have a surface area of from 10 to 1000 $m^2/g$, or from 50 to 500 $m^2/g$, or from 100 to 400 $m^2/g$, or from 200 to 300 $m^2/g$.

In one form, the sulfur oxides trap is composed of a metal (M) oxide, wherein M is selected from copper, iron, manganese, cobalt, ceria, silver, zirconium and combinations thereof. Such metal oxide catalysts may be optionally supported on a catalyst support (S) which is selected from an oxide of alumina, stabilized gamma alumina with rare earth components, MCM-41, zeolites, silica, magnesium, zirconia, ceria, ceria-zirconia, titania, titania-zirconia, and combinations thereof. In this form, the metal oxide adsorbs $SO_x$ as a metal sulfate at a temperature from 200 to 600° C., or 200 to 550° C., or 200 to 500° C. under lean exhaust conditions from the combustion source. Additionally, the metal oxide then desorbs $SO_x$ by reduction of metal sulfate at a temperature from 300 to 575° C., or 400 to 575° C., or 400 to 500° C., or 500 to 550° C. under rich exhaust conditions from the combustion source. For example, the sulfur oxides trap may include an oxide of the structure iron oxide/support oxide wherein support is selected from the group consisting of $Al_2O_3$, $SiO_2$, $ZrO_2$, $CeO_2-ZrO_2$, $TiO_2-Al_2O_3$, MCM-41, and Zeolites. The Iron oxide system has low SOx adsorption efficiency at low temperature (<350° C.). The low temperature SOx adsorption of the system can be improved by adding an upstream Pt oxidation catalyst. Alternatively, Ag and Ce may also be added to iron oxide formulation. When manganese oxide or ceria is used as the sulfur trap catalyst composition, no upstream Pt oxidation catalyst is needed. In this form, ceria and manganese oxide adsorbs SOx as a metal sulfate at a temperature from 200 to 550° C., or 200 to 500° C. under lean exhaust conditions from the combustion source. Additionally, the manganese oxide or cerium oxide then desorbs $SO_x$ as $SO_2$ or a mixture of $SO_2$ and $H_2S$ by reduction of metal sulfate at a temperature from 550 to 650° C., or 550 to 600° C., or 550 to 575° C., or at 575° C. under a rich exhaust conditions from the combustion source.

In yet another form, the regenerable sulfur oxides trap catalyst composition for trapping $SO_x$ from a combustion source comprises a metal oxide selected from Ce—Zr oxide, Ce—Fe oxide, Ce—Zr—Fe oxide, and combinations thereof. Such metal oxide catalysts may also be optionally supported on a catalyst support (S) which is selected from an oxide of alumina, stabilized gamma alumina with rare earth components, MCM-41, zeolites, silica, magnesium, zirconia, ceria, ceria-zirconia, titania, titania-zirconia, and combinations thereof. In this form, the metal oxide adsorbs $SO_x$ as a metal sulfate at a temperature from 200 to 600° C., or 200 to 550° C., or 200 to 500° C. under lean exhaust conditions. Additionally, the metal oxide desorbs $SO_x$ by reduction of metal sulfate at a temperature from 300 to 575° C., or 300 to 550° C., or 400 to 550° C. under rich exhaust conditions. In one particular form, when the catalyst composition comprises Ce—Fe oxide, $SO_x$ may be adsorbed as a metal sulfate at a temperature from 200 to 600° C., or 200 to 550° C. under lean exhaust conditions. Additionally, the Ce—Fe oxide desorbs $SO_x$ by reduction of metal sulfate at a temperature from 400 to 575° C., or 400 to 500° C., or 450° C. under rich exhaust conditions. Silver may be further included in the catalyst composition to extend these operating windows for adsorption and desorption.

In another form, the regenerable sulfur oxides trap catalyst composition for trapping $SO_x$ from a combustion source comprises a mixed metal (M)-La—Zr oxide, wherein M is selected from Cu, Fe, Mn, Ag, Ce, Co and combinations thereof. Such metal-La—Zr oxide may be optionally supported on a catalyst support (S) which is selected from an oxide of alumina, stabilized gamma alumina with rare earth components, MCM-41, zeolites, silica, magnesium, zirconia, ceria, ceria-zirconia, titania, titania-zirconia, and combinations thereof. In this form, the metal-La—Zr oxide adsorbs $SO_x$ as a metal sulfate at a temperature from 200 to 600° C., or 200 to 550° C., or 200 to 500° C. under lean exhaust conditions. Additionally, the metal-La—Zr oxide desorbs $SO_x$ by reduction of metal sulfate at a temperature from 300 to 650° C., or 300 to 575° C., or 400 to 575° C., or 300 to 550° C., or 400 to 625° C., or 500 to 625° C., or 500 to 600° C., or 550 to 600° C. or 550 to 575° C. under rich exhaust conditions. In one advantageous form, the metal-La—Zr oxide is a mixed Mn—LaZr oxide. More particularly, the Mn—La—Zr oxide comprises from 5 to 25 wt % Mn, from 3 to 10 wt % La, from 5 to 60 wt % Zr. The Mn—La—Zr oxide catalyst may have a sample surface area from 50 to 400 $m^2$/gram. These mixed metal oxides may be supported on a support material. The support material may be selected from alumina, stabilized gamma alumina, MCM-41, zeolites, silica titania, titania-zirconia, and combinations thereof. The support material may have a surface area of from 10 to 1000 $m^2$/g, or from 50 to 500 $m^2$/g, or from 100 to 400 $m^2$/g, or from 200 to 300 $m^2$/g.

The sulfur trap catalyst compositions and supports disclosed herein result in selective oxidation of CO from the combustion source to form $CO_2$ while leaving $H_2$ unreacted ($H_2O$ does not form) under rich exhaust conditions. The $H_2$ source is needed to assist in regenerating the sulfur trap by desorbing $SO_x$. Under lean conditions, $SO_x$ in the combustion source is converted to a metal sulfate through the use of catalyst compositions disclosed herein.

The nitrogen storage reduction (NSR) catalyst (also referred to as nitrogen oxide trap, $NO_x$ trap, $NO_x$ adsorbent) may be selected from the noble metals, including, but not limited to Pt, Pd, Rh, and combinations thereof, and a porous carrier or substrate carrying the noble metals, including, but not limited to alumina, MCM-41, zeolites, titania, and titania-zirconia. The NSR catalyst trap may further include alkali metals and/or alkaline earth metals, for example, Li, K, Cs, Mg, Ca, Sr, Ba and combinations of the alkali metals and alkaline earth metals. The NSR catalyst trap may also include ceria, zirconia, titania, lanthanum and other similar materials, which are typically employed in a three-way catalyst. Ag may be included in the NSR composition while lowering the Pt content (or removing Pt) because Ag was found to enhance NO oxidation to $NO_2$ and thus $NO_x$ storage efficiency. Other NSR formulations described in the literature may also be used.

For the sulfur traps disclosed herein to be effective for NSR catalyst protection, a number of critical parameters need to be controlled including one or more of the following: It is clear from this study that for sulfur trap to be a feasible system for NSR catalyst protection a number of critical parameters need to be controlled, which are as follows: (1) Temperature around NSR catalyst during sulfur species release from $SO_x$ trap which needs to be controlled at a temperature window from about 400 to 575° C., or 425 to 550° C., or 450 to 500° C., (2) molar ratio of $H_2$ to sulfur species (e.g. this ratio need to be close to about 50 and higher, or 60 and higher, or 80 and higher, or 100 and higher at a temperature of 450° C., and (3) the nature of $NO_x$ storage sites (e.g. keep barium sites as $BaCO_3$ and avoid the formation of $Ba(OH)_2/BaO$) and the spacing between $SO_x$ trap and NSR catalyst because it will affect the temperature around NSR catalyst. An external unit to control the temperature window around NSR catalyst may be optionally added if necessary. Regarding the molar ratio of $H_2$ to sulfur species, when higher temperatures are used, this ratio may decrease. For example, at a temperature of 500° C., the ratio may be 20 and higher, or 30 and higher, or 40 and higher, or 50 and higher. In another example, at a temperature of 600° C., the ratio may be 10 and higher, or 20 and higher, or 30 and higher, or 40 and higher.

In a further advantageous embodiment, the exhaust system according to the disclosure includes a clean-up catalyst trap downstream of the NSR. This is particularly useful with $SO_x$ traps wherein during regeneration produce $H_2S$, which has an unpleasant smell. In order to combat this, the clean-up catalyst trap comprises a component for suppressing $H_2S$, for example oxides of one or more of nickel, manganese, cobalt and iron. Such components are useful at least because of their ability to trap hydrogen sulfide under rich or stoichiometric conditions and, at lean conditions, to promote the oxidation of hydrogen sulfide to sulfur dioxide. In an alternative embodiment, the clean-up catalyst can also be configured so as to contend with HC slip past the oxidation catalyst of the disclosure, which can occur where there is insufficient oxygen in the gas stream to oxidize the HC to $H_2O$ and $CO_2$. In this case, the clean-up catalyst includes an oxygen storage component with catalytic activity, such as ceria and or Pt group metals (PGM). The clean-up catalyst trap may also contain a $NH_3$ trap which may form during regeneration of the NSR catalyst trap. The $NH_3$ trap preferably includes zeolites such as ZSM-5, Beta, MCM-68, or metal containing zeolites, wherein the metal can be selected from Fe, Co, and Cu. The trapped NH3 can then react with $NO_x$ to form $N_2$ under lean conditions. If necessary, air can be injected upstream of the clean-up catalyst during rich regeneration of the $SO_x$ trap.

All the catalysts systems (catalytic $H_2$ generation, $SO_x$ trap, NSR, WGS and clean-up catalyst) described above may be provided on a separate substrate such as a flow-through honeycomb monolith. The monolith may be metal or ceramic, where ceramic it can be cordierite, although alumina, mulitte, silicon carbide, zirconia are alternatives. Manufacture of coated substrate may be carried out by methods known to one skilled in the art.

A catalyzed Diesel Particulate Filter (DPF) system may be optionally positioned (for a diesel engine) upstream of the sulfur trap to remove particulate matter from the engine exhaust source. The DPF system is particularly advantageous when combusting diesel fuels. A variety of DPF and filter configurations are available in the market today (Summers et al. Applied Catalysis B: 10 (1996) 139-156). The most common design of DPF is the wall-flow monolith, which consists of many small parallel ceramic channels running axially through the part (Diesel particulate traps, wall-flow monoliths, Diesel Technology Guide at www.dieselnet.com). Adjacent channels are alternatively plugged at each end in order to force the diesel exhaust gases through the porous substrate walls, which act as a mechanical filter. As the particulate (soot) load increases and the need for regeneration increases. The regeneration requires the oxidation of the collected particulate matter. Pt may be added to DPF to enhance such oxidation. In one form, a Pt oxidation catalyst trap may be positioned upstream of the sulfur trap when using iron oxide as the sulfur trap catalyst material because of the relatively poor adsorbing characteristics of $SO_x$ at low temperatures (<350° C.). The use of a Pt oxidation catalyst trap also helps in broadening the temperature window for adsorption at lower temperatures (<350° C.). In contrast, in another form when using manganese oxide or cerium oxide as the sulfur trap catalyst material, a Pt oxidation catalyst trap may not be needed upstream of the sulfur trap. Additionally, silver may be added to $SO_x$ trap formulation or Pt oxidation catalyst to enhance low temperature $SO_x$ adsorption.

The above systems may be organized into various configurations to yield improved exhaust gas treatment systems. The various configurations include, but are not limited to, a series arrangement of the systems, a layered arrangement of the systems, and a combination of a series and layered arrangement of the systems. The various configurations of the exhaust gas treatment system will be demonstrated by the exemplary embodiments which follow.

FIG. 1 depicts an exemplary embodiment of the present disclosure for an improved exhaust gas treatment unit comprising a combustion engine exhaust source, a hydrogen generator system (1), a $SO_x$ trap (2) downstream of the $H_2$ generator system (1), and a NSR catalyst trap (3) downstream of the $SO_x$ trap (2). During the lean operation of the engine, $SO_2$ is oxidized to $SO_3$ which is trapped as sulfate on sulfur trap (2) components. During the rich operation of the engine and at a temperature of 450° C., the sulfates are decomposed, and the released sulfur species pass through NSR catalyst trap (3) in the presence of $H_2$ (1). The quantities of sulfur oxides contained in the exhaust gas from an internal combustion engine are much smaller than the quantities of nitrogen oxides, and therefore, it is not necessary to also remove sulfur from the sulfur oxide trap each time the nitrogen oxides are released from the storage catalyst. The period of the cycle for releasing nitrogen oxides from the NSR catalyst trap is about one minute, whereas the period for releasing from the sulfur trap is several hours. The exemplary embodiment of FIG. 1 with the hydrogen generated upstream of the sulfur trap is suitable when the hydrogen source originates from the combustion engine.

Figure 2:
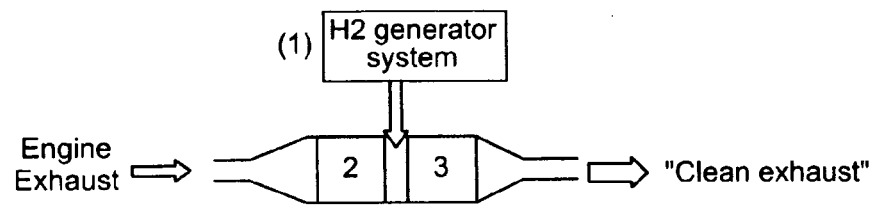
FIG. 2 depicts an illustrative schematic of a treatment unit for the exhaust gas from an engine with the only difference from FIG. 1 being that that the rich gas $H_2$ generator system (1) is positioned downstream of the $SO_x$ trap (2) and upstream of the NSR catalyst trap (3).

FIG. 2 depicts an alternative exemplary embodiment of a treatment unit for an exhaust gas according to the present disclosure comprising a combustion engine exhaust source, a $SO_x$ trap (2), a hydrogen generator system (1) downstream of the $SO_x$ trap (2), and a NSR catalyst trap (3) downstream of the hydrogen generator system (1). The only difference from FIG. 1 is the position of the $H_2$ generator system (1) being positioned downstream of the $SO_x$ trap (2) and upstream of the NSR catalyst trap (3). The exemplary embodiment of FIG. 2 with the hydrogen injected between the sulfur trap and the NSR catalyst trap is particularly suitable when the hydrogen source originates from a source other than the combustion engine.

Figure 3:
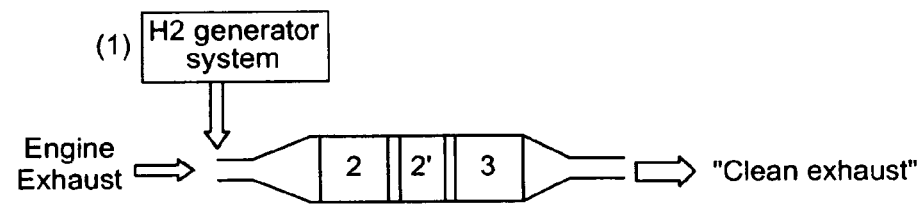
FIG. 3 depicts an illustrative schematic of an exhaust gas purifying system for an internal combustion engine having a $H_2$ rich gas generation system (1) and the 3 catalyst systems (sulfur trap (2), a water-gas-shift (WGS) catalyst (2'), and a NSR catalyst trap (3)). The only difference from FIG. 1 is that a WGS catalyst (2') is added upstream of the NSR catalyst trap (3).

FIG. 3 depicts an alternative exemplary embodiment of an exhaust gas purifying system for an internal combustion engine according to the present disclosure including a $H_2$ generation system (1) and 3 catalyst systems (sulfur trap (2), a water-gas-shift (WGS) catalyst (2'), and a NSR catalyst trap (3)). The $H_2$ generation system (1) is positioned downstream of the engine exhaust source and upstream of the sulfur trap (2). A WGS catalyst (2') is positioned down-stream of the sulfur trap (2) and upstream of a NSR catalyst trap (3). The only difference from FIG. 1 is that a WGS catalyst (2') is added upstream of the NSR catalyst trap (3).

Figure 4:
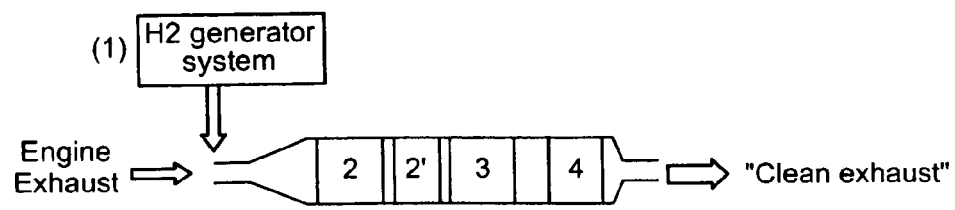
FIG. 4 depicts an illustrative schematic of an exhaust gas purifying system for an internal combustion engine, according to the present disclosure, having a $H_2$ rich gas generator system (1) and the 3 catalyst systems (sulfur trap (2), a WGS (2'), a NSR catalyst trap (3)), and additionally a clean-up trap/catalyst (4).

FIG. 4 depicts a further exemplary embodiment of an exhaust gas purifying system for an internal combustion engine, according to the present disclosure, having a $H_2$ generator system (1), 3 catalyst systems (sulfur trap (2), a WGS catalyst (2'), a NSR catalyst trap (3)), and additionally a clean-up catalyst (4). The $H_2$ generation system (1) is positioned downstream of the engine exhaust source and upstream of the sulfur trap (2). A WGS catalyst (2') is positioned downstream of the sulfur trap (2) and upstream of a NSR catalyst trap (3). A clean-up catalyst (4) is then positioned downstream of the NSR catalyst trap (3). The only difference from FIG. 3 is the addition of a clean-up catalyst trap (4) downstream of the NSR catalyst trap (3).

The preceding exemplary embodiments may further include a particulate removal system downstream of the engine exhaust source and upstream of both the hydrogen generation system (1) and the sulfur trap (2). The particulate removal system is particularly advantageous when a diffusion flame type combustion is utilized, for example as in current day diesel engines, since this leads to soot formation.

The catalyst comprising the exhaust gas treatment system may be alternatively configured in a layered arrangement by forming layers of one of more of the various catalysts ($SO_x$, WGS, NSR catalysts) on top of one another. For example, the NSR catalyst trap is deposited as a contiguous layer on a suitable support material, and then the sulfur oxide catalyst is deposited as a contiguous layer on top of the NSR catalyst trap layer. In an alternative exemplary embodiment, the NSR catalyst trap is deposited as a contiguous layer on a suitable support material, the WGS catalyst deposited as a contiguous layer on top of the NSR catalyst trap layer, and then the sulfur oxide catalyst deposited as a contiguous layer on top of the WGS catalyst layer. In these layered catalyst configurations, the exhaust gas diffuses first through the outer sulfur oxide catalyst layer, followed by the WGS catalyst layer, and finally the through NSR catalyst trap layer. These exemplary layered catalyst configurations are coupled with an upstream hydrogen generation source. In addition, these exemplary layered catalyst configurations may be optionally configured with an upstream particulate removal system, and a downstream clean-up catalyst trap.

Applicants have attempted to disclose all embodiments and applications of the disclosed subject matter that could be reasonably foreseen. However, there may be unforeseeable, insubstantial modifications that remain as equivalents. While the present disclosure has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

The following examples illustrate the present disclosure and the advantages thereto without limiting the scope thereof.

Test Methods

In terms of catalyst preparation, the NSR catalyst trap used for these studies was supplied in washcoated monolith from a commercial source. The washcoat composition contains $NO_x$ reduction sites (Pt/Rh), a storage compound (Ba), support ($\gamma$-$Al_2O_3$), and other promoters selected from ceria, titania, zirconia and lanthanum. The catalyst was pretreated at 450° C. for 15 minutes under simulated rich exhaust before testing (see Table 1, Feed 1).

The monolithic NSR core (0.75 in length×0.5 in diameter) is placed in a quartz reactor on top of a piece of quartz wool with several inches of crushed fused quartz added as a preheat zone. The quartz reactor is heated by a furnace. The temperature is controlled by a type-K thermocouple located inside a quartz thermowell inside the narrowed exit portion of the reactor located below the monolithic core. The activity tests were conducted in a flow reactor system by using different gas mixtures as depicted in Table 1. A FTIR and a Mass Spectrometer (MS) were used to analyze the gas phase effluents (e.g., NO, $NO_2$, $H_2S$, $SO_2$, $N_2O$, $NH_3$, CO, $CO_2$, etc.). Two rich gas mixtures were considered for sulfur species adsorption on the catalyst. The first gas consists of 90 ppm $SO_2$ (or $H_2S$), 2000 ppm $C_3H_6$, 1000 ppm CO, 11% $CO_2$, 6% $H_2O$ in He (Table 1, Feed 2a). The second gas consists of 90 ppm $SO_2$ (or $H_2S$), 1% $H_2$, 11% $CO_2$, 6% $H_2O$ in He (Table 1, Feed 2b). The sulfur species adsorbed while flowing a rich gas mixture were then oxidized under a lean gas mixture (Table 1, Feed 3) before measuring $NO_x$ storage capacity of the catalyst. Tests for $NO_x$ storage capacity were done at 300° C. flowing a lean gas mixture containing NO (Table 1, Feed 4) over both fresh and sulfur-poisoned NSR catalyst. After $NO_x$ adsorption as nitrate, a regeneration step is used to decompose the nitrate using a rich gas mixture (Feed 2a or Feed 2b) free of $SO_2$ or $H_2S$.

TABLE 1

Rich-lean gas mixtures used at the laboratory test experiments

| Components in the feed | Pre-treatment under rich conditions | Sulfur poisoning under rich conditions | Oxidation of the adsorbed sulfur species under lean conditions | $NO_x$ storage under lean conditions |
|---|---|---|---|---|
| | Feed 1 | Feed 2a  Feed 2b | Feed 3 | Feed 4 |
| $SO_2$ or $H_2S$ (ppm) | 0 | 90    90 | 0 | 0 |
| NO (ppm) | 250 | 250   250 | 250 | 250 |
| $C_3H_6$ (ppm) | 2000 | 2000   0 | 2000 | 0 |
| CO (ppm) | 1000 | 1000   0 | 1000 | 0 |
| $H_2$ (%) | 0 | 0    1 | 0 | 0 |
| $CO_2$ (%) | 11 | 11    11 | 11 | 11 |
| $O_2$ (%) | 0 | 0    0 | 7 | 7 |
| $H_2O$ (%) | 6 | 6    6 | 6 | 0 |
| He | Balance | balance  balance | Balance | balance |

The total flow rate was 3000 cc/min, which corresponds to a space velocity of $49,727 h^{-1}$ (@ STP). The temperature was varied from 300 to 600° C.

FTIR. The spectrometer used was a Nicolet 670. A liquid nitrogen cooled MCT (Hg/Cd/Te) IR detector was used to provide a high-signal-to-noise ratio. Because of the narrow natural linewidth of the small gas molecules studied, we operated at a resolution of $0.5$ cm$^{-1}$. At this resolution, one scan requires 1.5 seconds. Background spectra were collected daily, with the cell filled with flowing dry He. Two gas cells with a path length of 2 and 10 m, equipped with ZnSe windows were used. The cell was heated to a temperature of 165° C.

Mass spectrometer. A quadrupole MS (Pfeifer vacuum system) was used for sulfur species analysis XRD. X-ray powder diffraction patterns were recorded on a Siemens D500 diffractometer using Cu Kα radiation.

Thermodynamic calculations. The thermodynamic calculations were performed using the commercial software HSC Chemistry.

EXAMPLES

Example 1

Effect of $SO_x$ and $H_2S$ on $NO_x$ Reduction Efficiency at 450° C.

Figure 5:
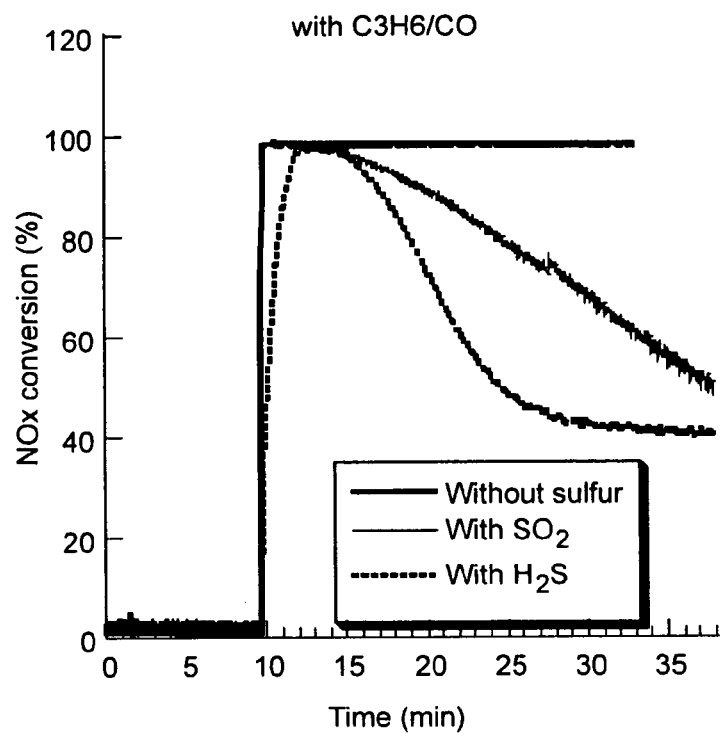
FIG. 5 depicts a graphical illustration of the $NO_x$ reduction at 450° C. over a NSR catalyst trap under simulated rich conditions containing $C_3H_6/CO$ in the presence (Feed 2a, Table 1) and absence (Feed 1, Table 1) of sulfur species and with no $H_2$.
Figure 6:
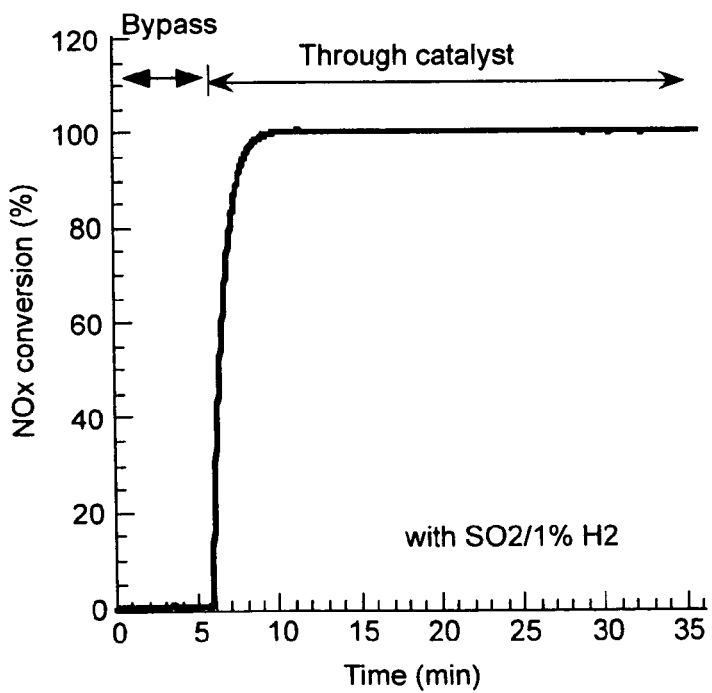
FIG. 6 depicts a graphical illustration of the effect of $SO_2$ on $NO_x$ reduction at 450° C. over a NSR catalyst trap under simulated rich conditions containing $H_2$ (Feed 2b, Table 1).
Figure 7:
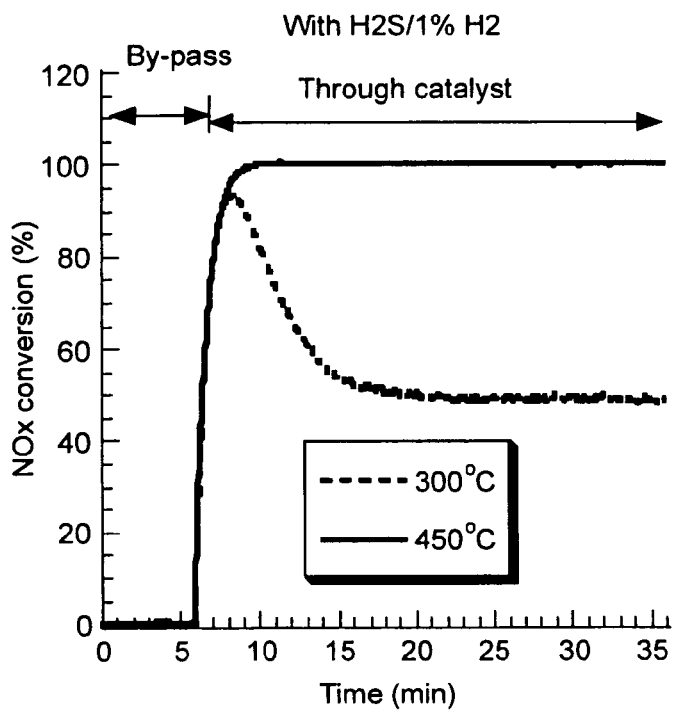
FIG. 7 depicts a graphical illustration of the effect of $H_2S$ on $NO_x$ reduction at 300° C. and 450° C. over a NSR catalyst trap under simulated rich conditions containing $H_2$ (Feed 2b, Table 1).
Figure 8:
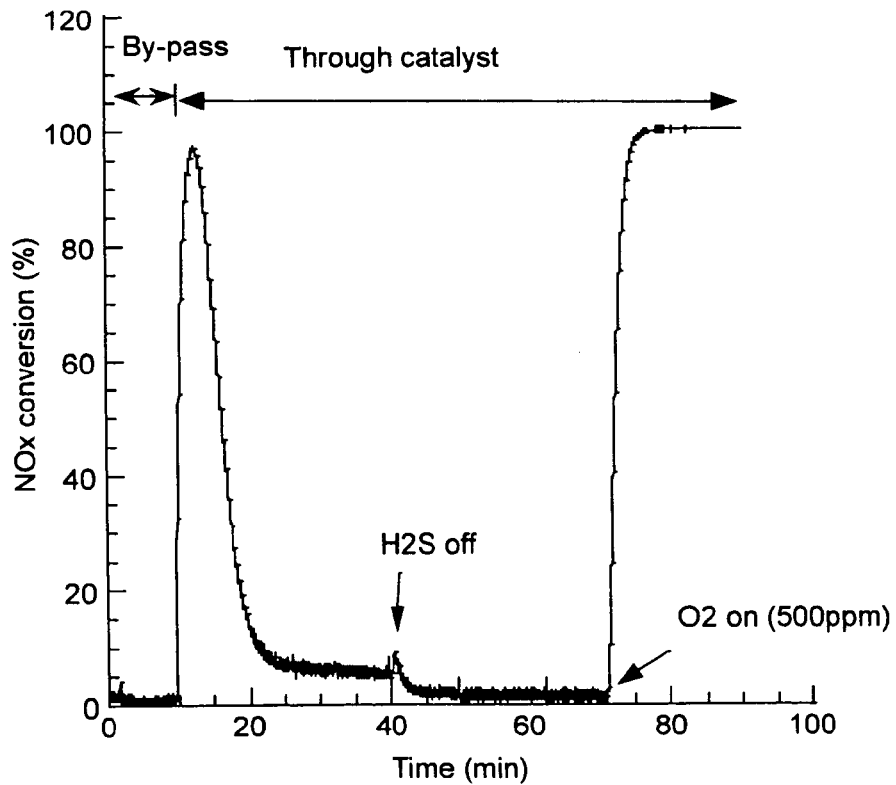
FIG. 8 depicts a graphical illustration of the effect of $H_2S$ on $NO_x$ reduction at 300° C. over a NSR catalyst trap under simulated rich conditions containing $C_3H_6/CO$ (Feed 2a, Table 1).

The interaction of sulfur species with noble metal sites (e.g., Pt and or Rh) can directly be determined by looking to $NO_x$ reduction under rich conditions. Any poisoning of noble metal sites will translate into a decrease in $NO_x$ conversion. FIG. 5 depicts a graphical illustration of the effect of trapped $SO_2$ and $H_2S$ on $NO_x$ reduction at 450° C. under a simulating rich exhaust containing $C_3H_6/CO$ (Feed 2a). As can be seen in FIG. 5, 100% $NO_x$ conversion is achieved without sulfur. Upon addition of sulfur species ($SO_2$ or $H_2S$), $NO_x$ conversion decreases as a function of exposure time. For instance, after 15 minutes of exposure to $SO_2$, $NO_x$ conversion decreases by about 20%. This decrease reached 50% in the presence of $H_2S$, indicating that sulfur poisoning of noble metal sites is more severe with $H_2S$ than with $SO_2$. $NO_x$ conversion stabilizes at around 40%, which indicates only a partial poisoning of the noble metal sites. FIG. 6 depicts a graphical illustration of the effect of $SO_2$ on $NO_x$ reduction at 450° C. under a simulating rich exhaust containing 1% $H_2$ (Feed 2b). As depicted in the figure, 100% $NO_x$ conversion is obtained, which shows no poisoning of noble metal sites. FIG. 7 depicts a graphical illustration of the effect of $H_2S$ on $NO_x$ reduction at 300° C. and at 450° C. under rich gas mixtures containing $H_2$ (Feed 2b). As can be seen, at 300° C. $NO_x$ conversion decreases, but stabilizes at around 50%, which again indicates the poisoning of only a fraction of the noble metal sites. On the other hand at 450° C., 100% $NO_x$ conversion is obtained, showing no poisoning of noble metal sites. FIG. 8 depicts a graphical illustration of the effect of $H_2S$ on $NO_x$ reduction at 300° C. under rich gas mixtures containing $C_3H_6/CO$ (Feed 2a). As can be seen, a complete poisoning of metal sites (Pt and Rh) when the NSR catalyst trap is exposed to rich gas mixtures containing $CO/C_3H_6$ and in presence of $H_2S$ at 300° C. Indeed, $NO_x$ conversion was completely lost after a 10 minute exposure to $H_2S$, and even after removal of $H_2S$, the $NO_x$ conversion was not restored indicating irreversible poisoning of noble metal sites. However, after addition of 500 ppm oxygen to the rich mixture (Feed 2a), full recovery of $NO_x$ conversion is observed indicating noble metal sites regenerated.

The decrease in $NO_x$ conversion in the presence of sulfur species (FIG. 5) is attributed to the formation of metal sulfide (e.g., PtS) due to $H_2S$ and $SO_2$ dissociation over noble metal sites. The fact that under the conditions used $NO_x$ conversion stabilizes to around 40-50% in the presence of sulfur species (FIGS. 5, 7) indicates that a limited portion of noble metal sites are poisoned by sulfur. Based on published literature, we attribute the decrease in $NO_x$ conversion to the poisoning of Pt sites, but not of Rh sites. Indeed, early laboratory studies of Pt and Rh in three-way catalysts (TWC) showed sulfur inhibition of catalytic activity to be dependent upon both catalyst composition and the operating conditions (W. B. Pierson et al., *SAE paper*, 790942 (1979). W. B. Williamson et al., Env. Sci. Tech., 14 (1980) 319. J. C. Summers and K. Baron, J. Catal., 57 (1979) 266. G. C. Joy et al. SAE paper, 790943 (1979)). It was found that $SO_2$ severely inhibited $NO_x$ conversion and ammonia formation over Pt under fuel rich operating conditions, but had minimal effect on the $NO_x$ performance of Rh catalysts. The sulfur inhibition was found to be much lower under stoichiometric conditions. It was also found that $NO_x$ reduction over Rh is higher than over Pt, both in the presence and absence of $SO_2$. The difference in performance between Rh and Pt is more pronounced when $SO_2$ is present due to the greater sulfur inhibition of the Pt catalyst (J. C. Summers and K. Baron, J. Catal., 57 (1979) 266). In the presence of CO, $SO_2$ was not adsorbed on the Rh catalyst, but coadsorption of CO and $SO_2$ was observed on the Pt catalyst (H. S. Gandhi et al., *SAE paper* 780606 (1978)). These literature results reveal a stronger interaction of sulfur species with Pt than with Rh. Another interesting observation is that the addition of small amount of $O_2$ to rich exhaust leads to full recovery of $NO_x$ reduction (FIG. 8) indicating that sulfide species can be removed from the noble metal surface, apparently achieved by the reverse of reaction 3 and formation of $SO_3$ as shown in reaction:

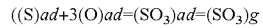

$$((S)ad+3(O)ad=(SO_3)ad=(SO_3)g$$

One issue with adding oxygen to avoid noble metal poisoning is that the oxidation of the adsorbed sulfide species leads to the formation of $SO_3$ which can then poison $NO_x$ storage components (e.g., Ba sites).

Example 2

$NO_x$ ($NO+NO_2$) Adsorption Under Lean Conditions (Feed 3, Table 1) at 300° C. after Oxidation of Adsorbed Sulfur Species In order to exhibit the extent that $NO_x$ storage sites (e.g., Ba) are poisoned by the trapped sulfur species, we have evaluated $NO_x$ storage efficiency at 300° C. under lean conditions (Table 1, Feed 4) for a fresh NSR trap and after different cycles of sulfur-poisoning. Each cycle of poisoning consists of treating Pt-containing $NO_x$ trap at 300 or 450° C. with a rich gas feed containing $SO_2$ or $H_2S$ (Table 1, Feed 2a or 2b) for 30 minutes followed by oxidation under lean conditions (Table 1, Feed 3) for 15 minutes. Any poisoning of $NO_x$ storage sites (e.g., Ba) by sulfur translates into a decrease in $NO_x$ storage efficiency. The $NO_x$ storage was evaluated using Feed 4 (Table 1).

Figure 9:
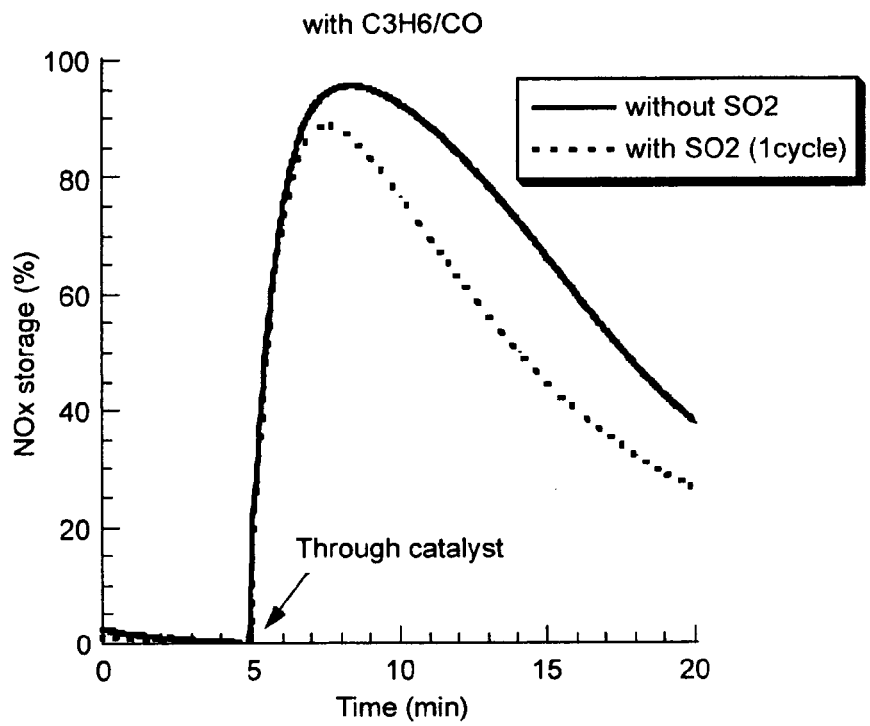
FIG. 9 depicts a graphical illustration of $NO_x$ storage (Feed 4, Table 1) at 300° C. following 1 cycle poisoning by $SO_2$ under simulated rich conditions containing $C_3H_6/CO$ (Feed 2a) and oxidation (Feed 3, Table 1) at 450° C. of the adsorbed $SO_2$.
Figure 10:
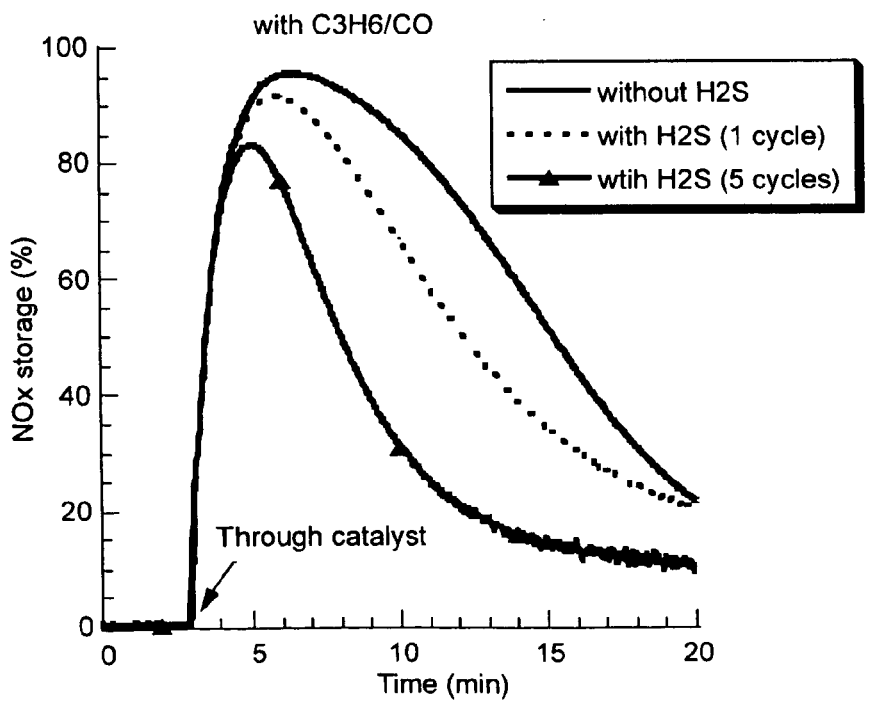
FIG. 10 depicts a graphical illustration of $NO_x$ storage (Feed 4) at 300° C. over a NSR catalyst trap following 1 and 5 cycles poisoning by $H_2S$ under simulated rich conditions containing $C_3H_6/CO$ (Feed 2a, Table 1) and oxidation (Feed 3, Table 1) at 450° C. of the adsorbed $H_2S$ between each cycle.
Figure 11:
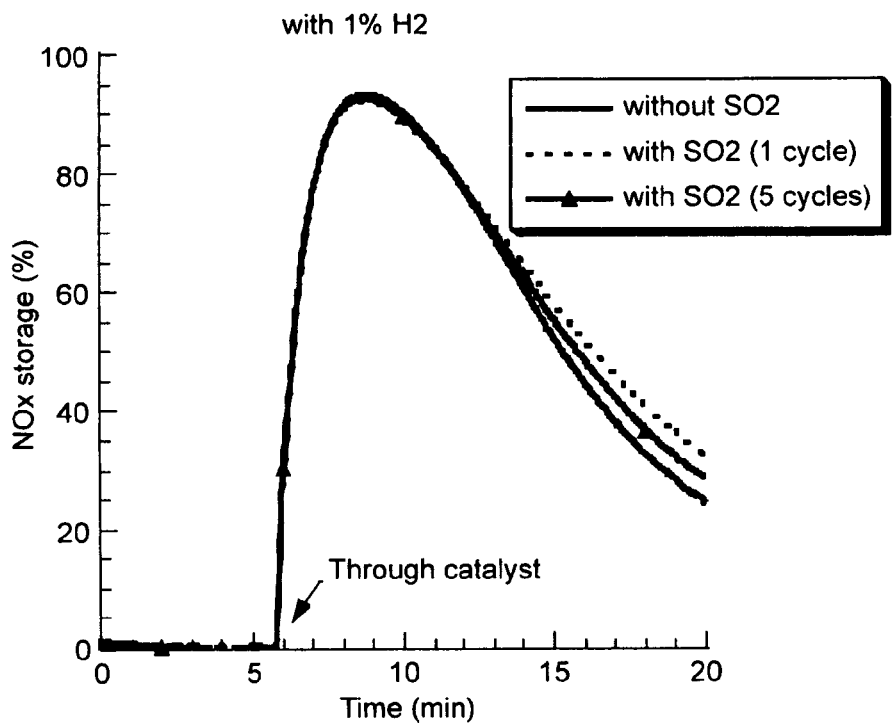
FIG. 11 depicts a graphical illustration of $NO_x$ storage (Feed 4) at 300° C. over a NSR catalyst trap following 1 and 5 cycles poisoning by $SO_2$ under simulated rich conditions containing $H_2$ (Feed 2b, Table 1) and oxidation (Feed 3, Table 1) at 450° C. of the adsorbed $H_2S$ between each cycle.
Figure 12:
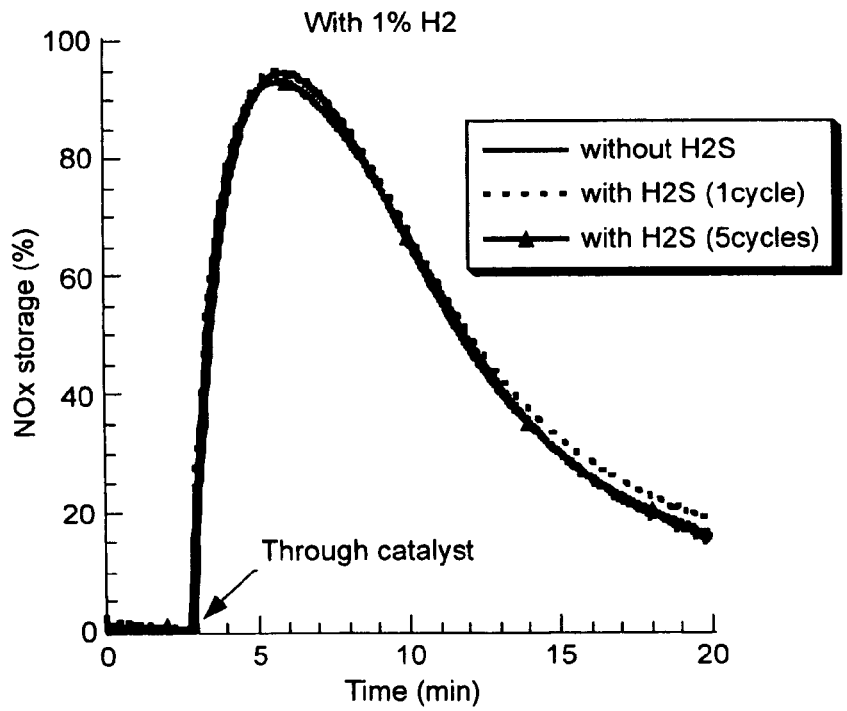
FIG. 12. depicts a graphical illustration of $NO_x$ storage (Feed 4) at 300° C. over a NSR catalyst trap following 1 and 5 cycles poisoning by $H_2S$ under simulated rich conditions containing H$_2$ (Feed 2b, Table 1) and oxidation (Feed 3, Table 1) at 450° C. of the adsorbed H$_2$S between each cycle.
Figure 13:
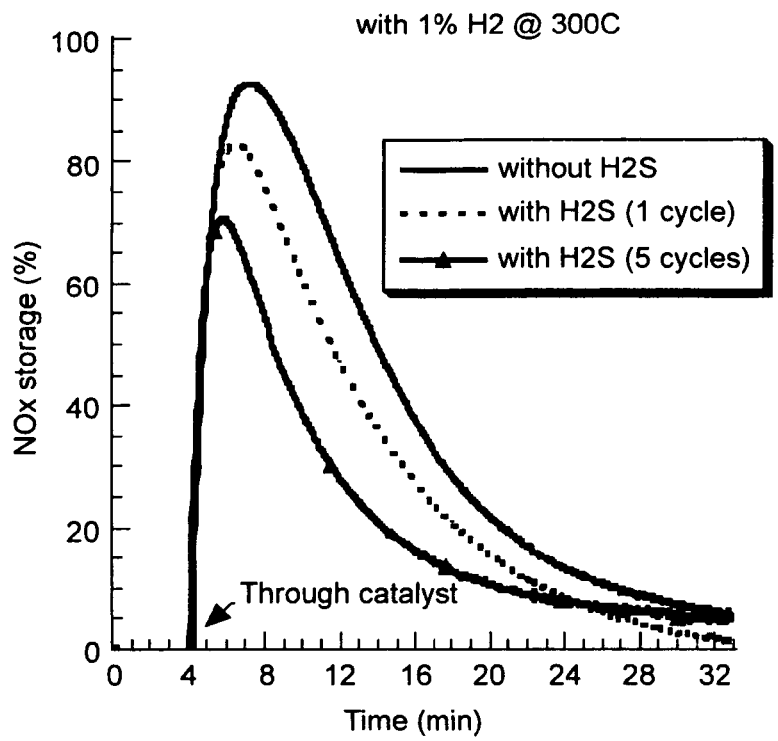
FIG. 13 depicts a graphical illustration of NO$_x$ storage (Feed 4, Table 1) at 300° C. over a NSR catalyst trap following 1 and 5 cycles poisoning by H$_2$S under simulated rich conditions containing H$_2$ (Feed 2b, Table 1) and oxidation (Feed 3, Table 1) at 300° C. of the adsorbed H$_2$S between each cycle.

FIG. 9 depicts a graphical illustration of $NO_x$ storage efficiency (Feed 3) at 300° C. following 1 cycle poisoning by $SO_2$ under simulated rich conditions containing $C_3H_6$/CO (Feed 2a) and oxidation (Feed 3) at 450° C. of the adsorbed $SO_2$. FIG. 10 depicts a graphical illustration of $NO_x$ storage efficiency (Feed 3) at 300° C. of NSR catalyst trap following 1 and 5 cycles poisoning by $H_2S$ under simulated rich conditions containing $C_3H_6$/CO (Feed 2a) and oxidation (Feed 3) at 450° C. of the adsorbed $H_2S$ between each cycles. FIG. 11 depicts a graphical illustration of $NO_x$ storage efficiency (Feed 4) at 300° C. following 1 and 5 cycles poisoning by $SO_2$ under simulated rich conditions containing $H_2$ (Feed 2b) and oxidation at 450° C. (Feed 3) of the adsorbed $SO_2$ between each cycle. FIG. 12 depicts a graphical illustration of $NO_x$ storage efficiency (Feed 4) at 300° C. following 1 and 5 cycle poisoning by $H_2S$ under simulated rich conditions containing $H_2$ (Feed 2b) and oxidation at 450° C. (Feed 3) of the adsorbed $H_2S$ between each cycle. FIG. 13 depicts a graphical illustration of $NO_x$ storage efficiency (Feed 4) at 300° C. following 1 and 5 cycle poisoning by $H_2S$ under simulated rich conditions containing $H_2$ (Feed 2b) and oxidation at 450° C. (Feed 3) of the adsorbed $H_2S$ between each cycle.

FIGS. 8-13 depict the $NO_x$ storage efficiency under lean conditions (Feed 4) of the poisoned NSR catalyst trap either by $SO_2$ (FIGS. 9, 11) or $H_2S$ (FIGS. 10, 12, 13). The oxidation with Feed 3 of the adsorbed sulfur species during rich conditions containing $C_3H_6$/CO (Feed 2a) affects $NO_x$ storage components (e.g., Ba sites) after 1 cycle poisoning by a 12 and 20% decrease in NOx storage capacity with respectively $SO_2$ (FIG. 9) and $H_2S$ (FIGS. 10, 13). The $NO_x$ storage efficiency continues to decrease after 5 cycle poisoning with $H_2S$ (FIGS. 10, 13) and a loss of 40-50% is observed in line with $NO_x$ storage components poisoning (e.g., formation of $BaSO_4$ after oxidation of adsorbed sulfur species). On the other hand, the $NO_x$ storage efficiency is not affected when NSR catalyst trap was exposed to sulfur species in the presence of $H_2$ at 450° C. (FIG. 11 and FIG. 12). In presence of $SO_2$ (FIG. 11), the $NO_x$ storage capacity even after 5 cycle poisoning is comparable to fresh catalyst. In the presence of $H_2S$ (FIG. 12), no difference between fresh and poisoned catalyst after the first 10 minutes and only minor change is observed after that with the respect to the experimental error. Even in presence of $H_2$, the temperature needs to be controlled to avoid any storage efficiency loss. Indeed, $NO_x$ storage capacity decreases by 20 to 50% when the NSR catalyst trap was exposed to $H_2S$ in presence of $H_2$ at 300° C. (FIG. 13).

Example 3

Understanding Sulfur Interaction with $NO_x$ Storage Sites (e.g., Ba) and $NO_x$ Reduction Sites (e.g., Pt).

Figure 14:
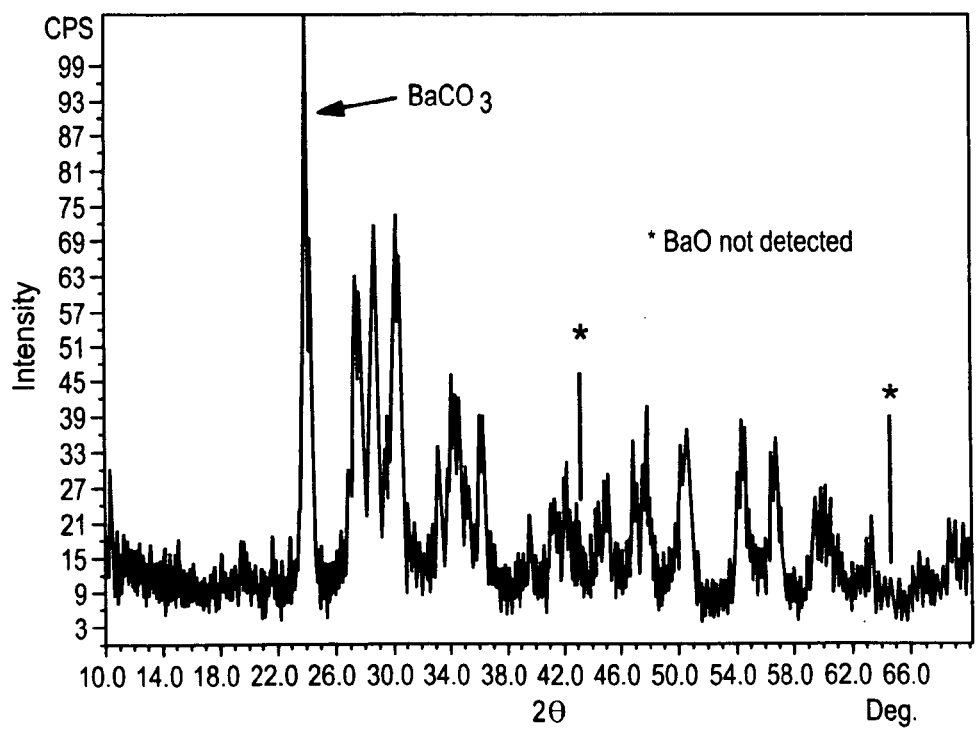
FIG. 14 depicts a XRD pattern of a pretreated fresh NSR.
Figure 15:
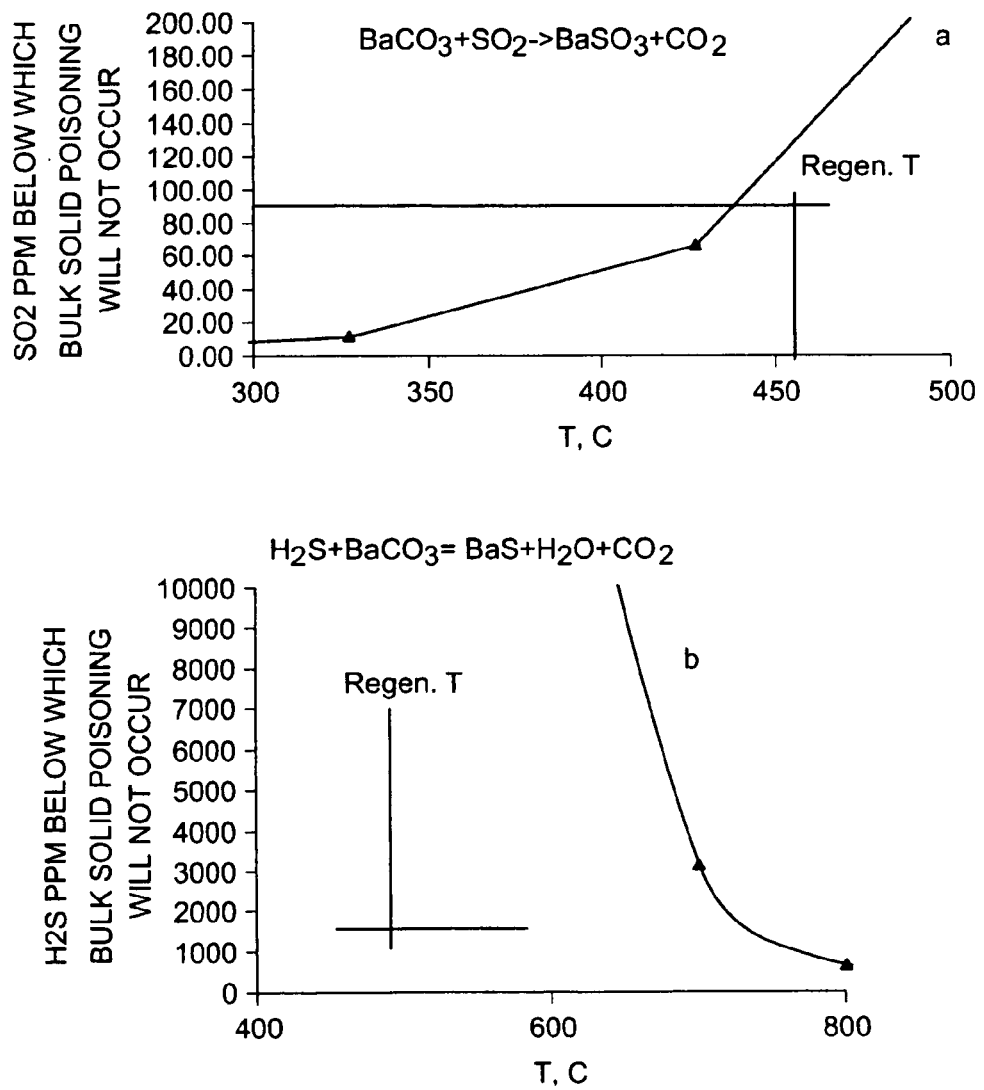
FIG. 15 depicts a graphical illustration of SO$_2$ and H$_2$S levels below which bulk solid poisoning of the NSR catalyst trap will not occur as a function of temperature.
Figure 16:
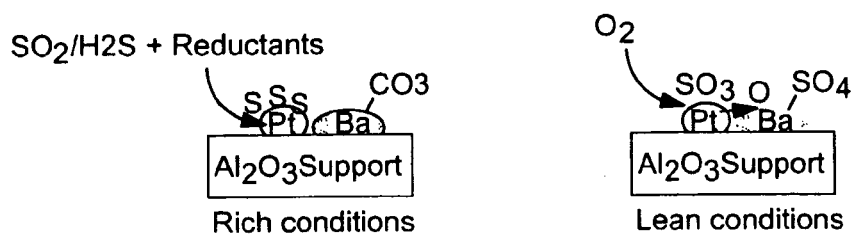
FIG. 16 depicts a schematic illustrating sulfur poisoning of Pt and Ba sites in NSR catalyst trap when cycling from rich to lean conditions.
Figure 17:
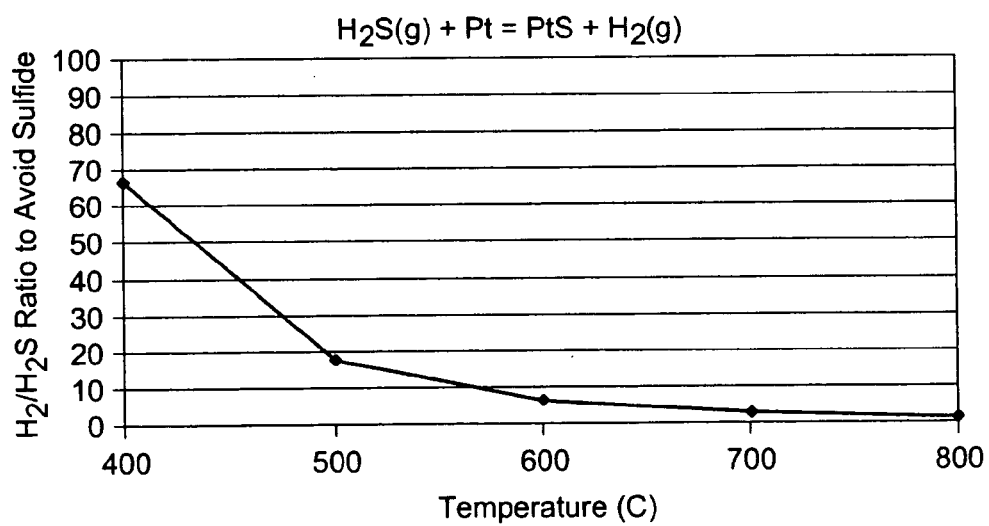
FIG. 17 depicts a graphical illustration of the H$_2$/H$_2$S ratio needed to avoid PtS formation as a function of temperature during regeneration of the SO$_x$ catalyst trap.

To understand the interaction of sulfur species with barium sites, it is important to determine at what conditions (rich/lean) barium sites are poisoned by sulfur. Under rich conditions, barium sites exist mainly as barium carbonate as indicated by XRD (FIG. 14). Thermodynamic calculation (FIG. 15) shows that 90 ppm of $SO_2$ or $H_2S$ species can pass through barium carbonate at 450° C. without forming $BaSO_3$ or BaS. Hence, it can be concluded that under rich gas mixtures and a temperature of 450° C., no adsorption of sulfur species on barium sites occurs. It is important to understand why barium carbonate sites are poisoned by the trapped sulfur species under lean conditions. There is a correlation between the sulfur poisoning of noble metal sites under rich conditions and barium sites under lean conditions. Indeed, any decrease in $NO_x$ reduction efficiency in the presence of sulfur species under rich conditions (see FIGS. 5, 7, 8) over a NSR catalyst trap leads to a decrease in $NO_x$ storage capacity under lean conditions (see FIGS. 6, 9, 10, 13). On the other hand, when 100% $NO_x$ reduction is observed under rich conditions (FIGS. 6, 7), no $NO_x$ storage loss under lean conditions is observed (FIGS. 11, 12). A simple scheme to explain the poisoning of barium and Pt sites is presented in FIG. 16. Under rich conditions, ($C_3H_6$/CO) sulfur species interact with Pt sites forming PtS and then when switching to lean conditions, the adsorbed sulfide are oxidized to $SO_3$, which then reacts with the barium carbonate forming $BaSO_4$. To avoid the PtS formation, $H_2$ is needed to shift the equilibrium of the reaction of $Pt+H_2S=PtS+H_2$. To shift the equilibrium to the right, it is important to control the temperature and $H_2$ concentration. As typified in FIG. 17, $H_2/H_2S$ is needed to avoid PtS formation. For instance at 450° C., the $H_2/H_2S$ needs to be higher than 50. The $H_2/H_2S$ ratio decreases with increasing temperature.

In summary, this study shows that under simulated rich conditions (presence of $C_3H_6$ and CO, no oxygen), sulfur species were trapped on the NSR catalyst trap at temperatures from 300° C. to 450° C. Such adsorption leads to a poisoning of noble metal sites as evidenced by a decrease of $NO_x$ reduction. When switching to lean conditions, the trapped sulfur species poison barium sites as evidenced by a decrease in $NO_x$ storage capacity. Under these conditions, a sulfur trap upstream of the commercial NSR catalyst trap is not feasible and bypassing the NSR is needed if such conditions will be used. On the other hand, this study shows that sulfur adsorption under rich conditions can be minimized/or eliminated by releasing the sulfur species $SO_2/H_2S$ in the presence of $H_2$ at a temperature of 450° C. At this temperature, $BaSO_3$/BaS formation is unfavorable and it appears that $H_2$ prevents the adsorption of sulfur on Pt sites. In addition, the comparison of $NO_x$ storage capacity between fresh and sulfur poisoned NSR catalyst trap shows similar trapping efficiency in line with no sulfur poisoning of barium sites. The implication of this finding is that the development of a sulfur trap upstream of the commercial NSR catalyst trap is feasible if $H_2$ can be provided during sulfur trap regeneration. To take advantage of these findings, strategies need to be developed to generate $H_2$ on-board the vehicle. In addition a regenerable $SO_x$ trap in the temperature range of 400-600° C. is needed to avoid sulfur adsorption by the NSR catalyst trap and also to limit the high temperature desulfation (>650° C.) of the catalyst.

Examples 4 to 9

Sulfur Trap Preparation, Sulfation, and Regeneration Preparation

Sulfur Trap Preparation:

The support used in this work was a commercial $Al_2O_3$ (with different surface area). The $Al_2O_3$ support was first calcined at 550° C. for 4 hours. The dried $Al_2O_3$ was then impregnated with metal salts solution selected from Fe, Cu, Mn, Ce, Co, Pt and other components. The metal contents was varied from 0.5 to 30 wt % against 100 wt % $Al_2O_3$ support, respectively. Other supports such as $SiO_2$, $ZrO_2$, $CeO_2$—$ZrO_2$ and ZSM-5 were also used.

Cu/$Al_2O_3$ catalyst (Example 4) was accomplished by the incipient method technique. This technique involves the addition of an aqueous solution of copper salt to a dry $Al_2O_3$ carrier until reaching incipient wetness. The concentration of the aqueous copper solution was adjusted to the desired Cu loading. As a typical example 1.8301 grams of copper nitrate hemipentahydrate $(Cu(NO_3)_2 \cdot 2.5H_2O$ was dissolved in 5.2 ml of deionized water. To this solution was added 5 grams of the dried $Al_2O_3$. The as prepared solid was mixed then dried in a vacuum oven at 80° C. and calcined in air at 550° C. for 4 hours. The final sulfur trap contained copper in an amount of 10 wt % per 100 wt % of $Al_2O_3$. The copper is present in the calcined sample as copper oxide.

Mn/$Al_2O_3$ catalyst (Example 5) was prepared in the same way as in Example 4. Differently from Example 4, the $Al_2O_3$ was impregnated with manganese nitrate hydrate. The final sulfur trap contained manganese in an amount of 10 wt % per 100 wt % of $Al_2O_3$. The manganese is present in the calcined sample as manganese oxide.

Co/$Al_2O_3$ catalyst (Example 6) was prepared in the same way as in Example 4. Differently from Example 4, the $Al_2O_3$ was impregnated with cobalt (II) acetate tetrahydrate. The final sulfur trap contained cobalt in an amount of 10 wt % per 100 wt % of $Al_2O_3$. The cobalt is present in the calcined sample as cobalt oxide.

Fe/$Al_2O_3$ catalyst (Example 7) was prepared in the same way as in Example 4. Differently from Example 4, the $Al_2O_3$ was impregnated with iron (III) nitrate nonahydrate. The final sulfur trap contained iron in amount of 10 wt % per 100 wt % of $Al_2O_3$. The iron is present in the calcined sample as iron oxide.

Ce/$Al_2O_3$ catalyst (Example 8) was prepared in the same way as in Example 4. Differently from Example 4, the $Al_2O_3$ was impregnated with cerium (III) nitrate hexahydrate. The final sulfur trap contained Cerium in an amount of 20 wt % per 100 wt % of $Al_2O_3$. The cerium is present in the calcined sample as cerium oxide.

Pt—Fe/$Al_2O_3$ catalyst (Example 9) was prepared as follows: the $Al_2O_3$ support was impregnated with an aqueous solution of platinum (II) tetra amine nitrate, dried at 80° C., then calcined in He 450° C. for 1 hour. The final sample contains 2 wt % Pt. Following these steps, the dried Pt/$Al_2O_3$ was then impregnated by renewed immersion in aqueous solution of iron (III) nitrate nonahydrate, dried at 80° C. and calcined at 550° C. for 4 hours in air. The calcined sample contained 2 wt % Pt and 10 wt % Fe.

An oxidation Pt/$Al_2O_3$ catalyst (Example 10) was prepared following a similar procedure as Example 9. This oxidation catalyst was used upstream system of sulfur traps described in Examples 4 through 7. The calcined sample contained 1 wt % Pt per 100 wt % of $Al_2O_3$.

Ag/$Al_2O_3$ catalyst (Example 11) was prepared as follows: 0.1607 grams of silver (I) nitrate dissolved in about 5 g of de-ionized $H_2O$. To this solution 5 grams of dried alumina was added. The mixture was mixed by hand and the solid was dried at 120° C. in air for at least 4 hours. The dried sample was then calcined in air at 500° C. for 2 hours. The Ag content was 2 weight % per 100 wt % of $Al_2O_3$.

Ce—Zr/$Al_2O_3$ catalyst (Example 12) was prepared in the same way as in example 4. Differently from example 4, the $Al_2O_3$ was impregnated with zirconyl nitrate hydrate and cerium (III) nitrate hexahydrate. The final sulfur trap contained cerium and zirconia in an amount of 10 wt % and 13% per 100 wt % of $Al_2O_3$. The cerium and zirconia are present in the calcined sample as cerium oxide and zirconium oxide.

Ce—Fe/$Al_2O_3$ catalyst (Example 13) was prepared in the same way as in example 4. Differently from example 4, the dried $Al_2O_3$ support was first impregnated with an aqueous solution of iron (III) nitrate nonahydrate, dried at 80° C., then calcined in air at 550° C. for 4 hours. The final sample contains 5 wt % Fe. Following these steps, the dried Fe/$Al_2O_3$ was then impregnated by renewed immersion in aqueous solution of cerium (III) nitrate hexahydrate, dried at 80° C. and calcined at 400° C. for 2 hours in air. The final sulfur trap contained cerium and iron in an amount of 5 wt % and 5% per 100 wt % of $Al_2O_3$.

Pt—Ba/$Al_2O_3$ catalyst (Example 14) was prepared as follows: the $Al_2O_3$ support was impregnated with an aqueous solution of platinum (II) tetraammine nitrate, dried at 80° C., then calcined in He @ 450° C. for 1 hour. Following these steps, the dried Pt/$Al_2O_3$ was then impregnated by renewed immersion in aqueous solution of barium (II) nitrate, dried at 80° C. for 12 hours and calcined at 550° C. for 4 hours in air. The final sulfur trap contained platinum and barium in an amount of 1 wt % and 10% per 100 wt % of $Al_2O_3$.

Examples 15 to 22 describe the synthesis of mixed metal oxides of Mn—La—Zr and Fe—La—Zr.

Mn—La—Zr (Example 15) catalyst was prepared as follows: 100.53 grams of a 35% solution of zirconyl nitrate, 19.33 grams of a of 50% solution of Manganese (II) nitrate, and 3.51 grams of Lanthanum nitrate hexahydrate were dissolved in 275 ml of distilled water. A second solution consisted of dissolving 21.0 g of lithium hydroxide monohydrate in 250 ml of distilled water. Under stirring the second solution was added slowly. The pH of the final composite was adjusted to approximately 9.0 by the addition of ammonium hydroxide or nitric acid. The resultant thick slurry was stirred at 70° C. overnight. The product formed was recovered by filtration, washed with excess water. The solids was then re-suspended in water acidified to pH 2.6 with nitric acid. Additional nitric acid was added until the final pH remained >6 and <7. The solids were then separated by filtration and dried at 80° C. under vacuum for 4 days. The solid was then crushed to <60 mesh and calcined in air for 4 hrs at 400° C. The final product contained 9.74% Mn, 3.79% La and 54.8% Zr as determined by ICP. The measured surface area was 267.4 $m^2/g$.

Mn—La—Zr (Example 16) catalyst was prepared as follows: 13.75 grams of a 35% solution of zirconyl nitrate, 7.775 grams of a of 50% solution of Manganese (II) nitrate, and 1.365 grams of Lanthanum nitrate hexahydrate and 78.5 grams of water were combined under stirring until dissolved. A second solution consisted of dissolving 21.2 g of lithium hydroxide monohydrate in 250 ml of distilled water. These two solutions were combined slowly with a solution of 100 ml water (pH adjusted to 9.0 using the second solution). The pH of the final composite was adjusted to approximately 9.0 by the addition of ammonium hydroxide or nitric acid. The resultant thick slurry was stirred at 70° C. overnight. The product formed was recovered by filtration, washed with excess water. The solids was then re-suspended in water acidified to pH 2.6 with nitric acid, additional nitric acid was added until the final pH remained >6 and <7. The solids were then separated by filtration and dried at 80 C under vacuum for 4 days. The solid was then crushed to <60 mesh and calcined in air at 400° C. for 4 hours. The final product contained 20.7% Mn, 7.6% La and 38.9% Zr as determined by ICP. The sample surface area was 239.0 m²/g.

Mn—La—Zr (Example 17) catalyst was prepared as follows: 17.82 grams of a 27% solution of zirconyl nitrate, 7.775 grams of a of 50% solution of Manganese (II) nitrate, and 1.365 grams of Lanthanum nitrate hexahydrate and 78.5 grams of water were combined under stirring until dissolved. A second solution consisted of dissolving 21.2 g of lithium hydroxide monohydrate in 250 ml of distilled water. These two solutions were combined slowly with a solution of 100 ml water (pH adjusted to 9.0 using the second solution). The pH of the final composite was adjusted to approximately 9.0 by the addition of ammonium hydroxide or nitric acid. The resultant thick slurry is stirred at 70° C. overnight. The product formed was recovered by filtration, washed with excess water. The solids was then re-suspended in water acidified to pH 2.6 with nitric acid, additional nitric acid was added until the final pH remained >6 and <7. The solids were then separated by filtration and dried at 80° C. under vacuum for 4 days. The solid was then crushed to <60 mesh and calcined in air at 400° C. for 4 hours. The final product contained 19.1% Mn, 7.05% La and 41.7% Zr as determined by ICP. The sample surface area was 250.6 m²/g.

Mn—La—Zr (Example 18) catalyst was prepared as follows: 17.82 grams of a 35% solution of zirconyl nitrate, 3.89 grams of a of 50% solution of Manganese (II) nitrate, and 1.365 grams of Lanthanum nitrate hexahydrate and 78.5 grams of water were combined under stirring until dissolved. A second solution consisted of dissolving 21.2 g of lithium hydroxide monohydrate in 250 ml of distilled water. These two solutions were combined slowly with a solution of 100 ml water (pH adjusted to 9.0 using the second solution). The pH of the final composite was adjusted to approximately 9.0 by the addition of ammonium hydroxide or nitric acid. The resultant thick slurry was stirred at 70° C. overnight. The product formed was recovered by filtration, washed with excess water. The solids was then re-suspended in water acidified to pH 2.6 with nitric acid, additional nitric acid was added until the final pH remains >6 and <7. The solids were then separated by filtration and dried at 80° C. under vacuum for 4 days. The solid was then crushed to <60 mesh and calcined in air at 400 C for 4 hours. The final product contained 10.7% Mn, 7.74% La and 50.04% Zr as determined by ICP. The sample surface area was 256.0 m²/g.

Mn—La—Zr (Example 19) catalyst was prepared as follows: 17.82 grams of a 35% solution of zirconyl nitrate, 2.60 grams of a of 50% solution of Manganese (II) nitrate, and 1.365 grams of Lanthanum nitrate hexahydrate and 78.5 grams of water were combined under stirring until dissolved. A second solution consisted of dissolving 21.0 g of lithium hydroxide monohydrate in 250 ml of distilled water. These two solutions were combined slowly with a solution of 100 ml water (pH adjusted to 9.0 using the second solution, Temperature adjusted to 70° C.). The pH of the final composite was adjusted to approximately 9.0 by the addition of ammonium hydroxide or nitric acid. The resultant thick slurry was stirred at 70° C. overnight. The product formed was recovered by filtration, washed with excess water. The solids were then resuspended in water acidified to pH 2.6 with nitric acid, additional nitric acid was added until the final pH remained >6 and <7. The solids were then separated by filtration and dried at 80° C. under vacuum for 4 days. The solid was then crushed to <60 mesh and calcined in air at 400° C. for 4 hours. The final product contained 8.17% Mn, 8.7% La and 50.7% Zr as determined by ICP. The sample surface area was 247.8 m²/g.

Mn—La—Zr (Example 20) catalyst was prepared as follows: 17.82 grams of a 35% solution of zirconyl nitrate, 3.89 grams of a of 50% solution of Manganese (II) nitrate, and 1.365 grams of Lanthanum nitrate hexahydrate and 78.5 grams of water were combined under stirring until dissolved. A second solution consisted of dissolving 31.25 grams of ammonium hydroxide in 250 ml of distilled water. These two solutions were combined slowly with a solution of 100 ml water (pH adjusted to 9.0 using the second solution, temperature adjusted to 70° C.). The pH of the final composite was adjusted to approximately 9.0 by the addition of ammonium hydroxide or nitric acid. The resultant thick slurry was stirred at 70° C. overnight. The product formed was recovered by filtration, washed with excess water. The solids were then re-suspended in water acidified to pH 2.6 with nitric acid, additional nitric acid is added until the final pH remains >6 and <7. The solids were then separated by filtration and dried at 80° C. under vacuum for 4 days. The solid was then crushed to <60 mesh and calcined in air at 400° C. for 4 hours. The final product contained 9.74% Mn, 3.79% La and 54.8% Zr as determined by ICP. The sample surface area was 252.4 m²/g.

Fe—La—Zr (Example 21) catalyst was prepared as follows: 17.82 grams of a 35% solution of zirconyl nitrate, 17.55 grams of Iron (III) nitrate hydrate, and 1.365 grams of Lanthanum nitrate hexahydrate and 86.25 grams of water were combined under stirring until dissolved. A second solution consisted of dissolving 21.2 g of lithium hydroxide monohydrate in 250 ml of distilled water. These two solutions were combined slowly with a solution of 100 ml water (pH adjusted to 9.0 using the second solution). The pH of the final composite was adjusted to approximately 9.0 by the addition of ammonium hydroxide or nitric acid. The resultant thick slurry was stirred at 70° C. overnight. The product formed was recovered by filtration, washed with excess water. The solids were then re-suspended in water acidified to pH 2.6 with nitric acid, additional nitric acid was added until the final pH remained >6 and <7. The solids were then separated by filtration and dried at 80° C. under vacuum for 4 days. The solid was then crushed to <60 mesh and calcined in air at 400° C. for 4 hours. The final product contained 32.1% Fe, 5.65% La and 29.8% Zr as determined by ICP. The sample surface area was 194.4 m²/g.

Fe—La—Zr (Example 22) catalyst was prepared as follows: 17.82 grams of a 35% solution of zirconyl nitrate, 10.11 grams of copper (II) nitrate hydrate, and 1.365 grams of Lanthanum nitrate hexahydrate and 86.25 grams of water were combined under stirring until dissolved. A second solution consisted of dissolving 21.2 g of lithium hydroxide monohydrate in 250 ml of distilled water. These two solutions were combined slowly with a solution of 100 ml water (pH adjusted to 9.0 using the second solution). The pH of the final composite was adjusted to approximately 9.0 by the addition of ammonium hydroxide or nitric acid. The resultant thick slurry was stirred at 70° C. overnight. The product formed was recovered by filtration, washed with excess water. The solids were then re-suspended in water acidified to pH 2.6 with nitric acid, additional nitric acid was added until the final pH remained >6 and <7. The solids were then separated by filtration and dried at 80° C. under vacuum for 4 days. The solid was then crushed to <60 mesh and calcined in air at 400 C for 4 hrs. The final product contained 33.9% Cu, 2.61% La and 33.4% Zr as determined by ICP. The sample surface area was 110.3 m²/g.

Sulfation (SOx Trapping):

The sulfur trap catalysts from examples 4 through 9 and 12 through 22 were tested in a bench flow reactor with a simulated lean exhaust gases containing $SO_2$. The simulated lean exhaust gas contained 30 ppm (or 300 ppm) $SO_2$, 5% $H_2O$, 5% $CO_2$, 10% $O_2$ and the balance He at a gas hourly space velocity of 60,000/hr. The higher than typical sulfur dioxide concentration, 30 ppm or 300 ppm, is utilized to accelerate the sulfation. The total flow rate of the gas was 1025 ml/minute. Typically 0.5 grams of catalysts (14-25 mesh size) from examples 4 through 9 and 12 through 22 was loaded in a quartz reactor then temperature heating was increased from 25° C. to 550° C. at 10° C./min under 10% $O_2$; holding sample for 1 hour at 550° C.; cooling to the desired sulfation temperature in the range of 200 to 500° C. At the desired temperature the simulated lean exhaust feed containing $SO_2$ was then passed through the catalyst for 20 hrs (with 30 ppm SO2) or for 2 hours (with 300 ppm SO2) and then the catalyst was purged with 10% $O_2$ in helium for 30 min then cooled to room temperature. For comparison, the $Pt/Al_2O_3$ oxidation catalyst (Example 10) was placed upstream of the sulfur traps of Examples 4 through 8. The layered catalysts were then sulfated at the same conditions (see above). In the case of the combination catalyst, 0.25 g of the Pt/alumina catalyst was placed on top of 0.25 g of the selected SOx trap.

Regeneration of Sulfated SOx Traps:

Regeneration of sulfated $SO_x$ traps was accomplished with 10% $H_2$+5% $CO_2$+5% $H_2O$ in a He carrier gas in the same bench flow reactor at desired temperature or using a TGA balance where the decomposition products were analyzed by a Mass spectrometer (MS) system. The sulfated sulfur traps (see sulfation procedure above) were regenerated in a 10% $H_2$ in He. Also, a thermal decomposition of the metal sulfate was performed in He. Approximately 20 mg of the sulfated sample was placed on the TGA balance (TGA/SDTA 851, Mettler Toledo, Inc.) and the gas feed ($H_2$ in He or He) was passed through the sample while the temperature was increased from 30° C. to 800° C. at a temperature ramp rate of 10° C./min. The sulfur species released from the sulfated sample were analyzed by on-line Mass Spectrometer (Pfeiffer Vacuum System).

Figure 18:
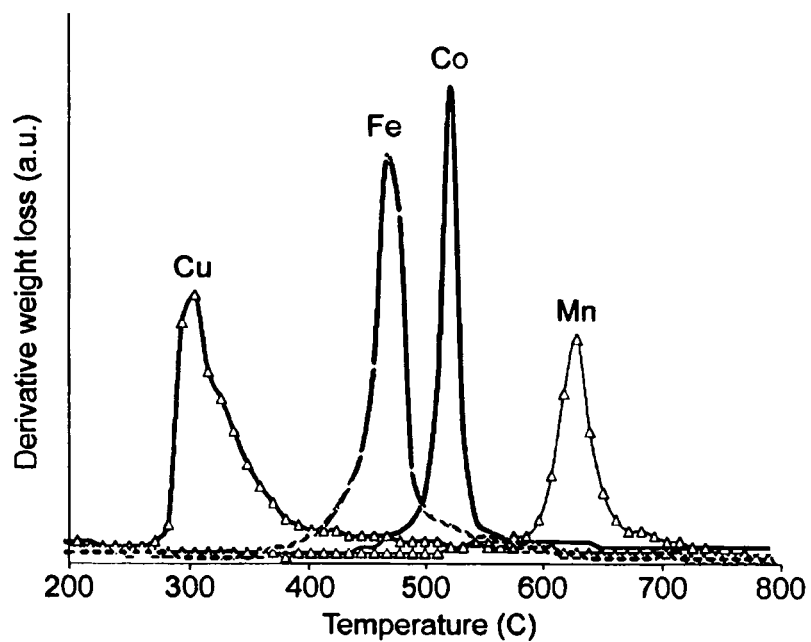
FIG. 18 depicts a graphical illustration of the first derivative of the weight loss during the reduction of the sulfated metal-containing alumina (Metal=Cu, Fe, Co and Mn).
Figure 19:
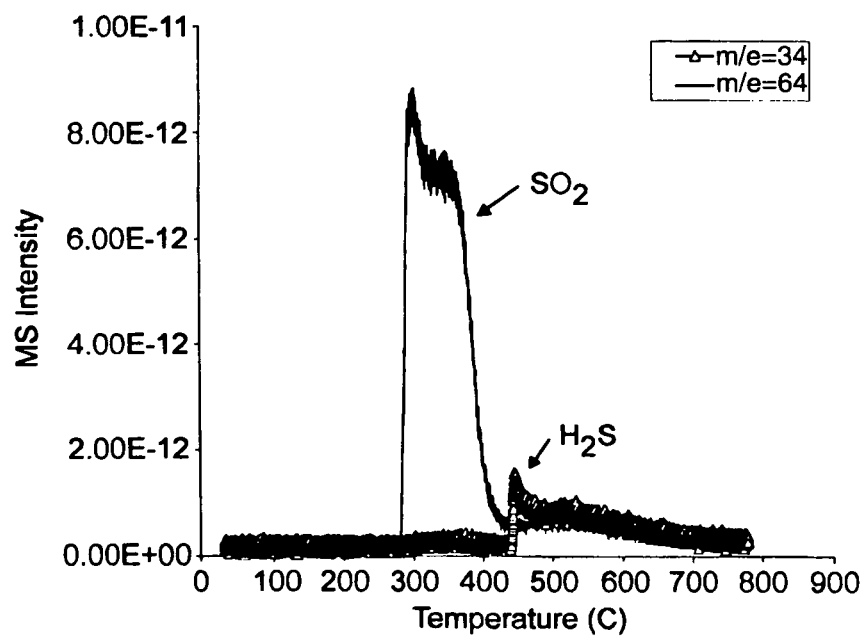
FIG. 19 depicts a graphical illustration of sulfur species released during the reduction of sulfated Cu/Al$_2$O$_3$ of example 4 (sulfation at 400° C.).
Figure 20:
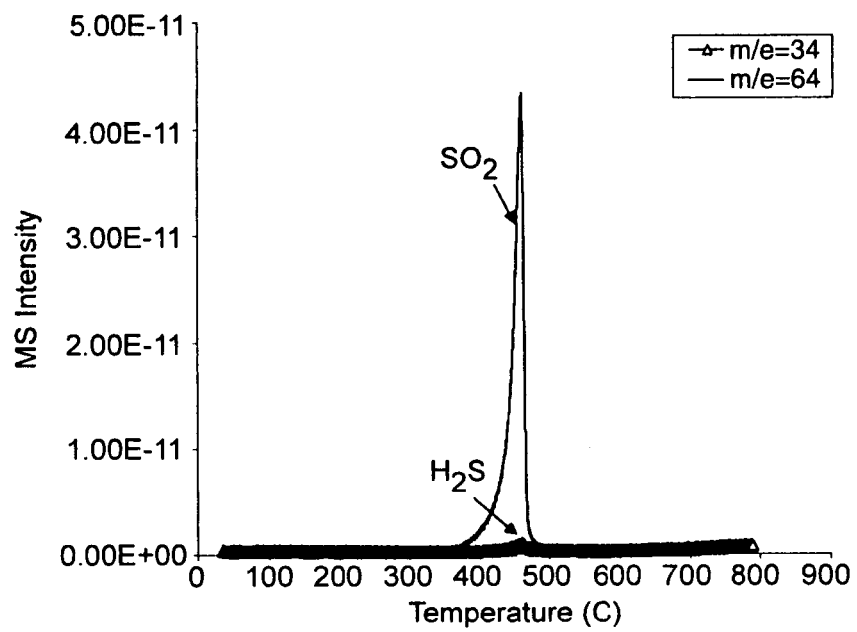
FIG. 20 depicts a graphical illustration of sulfur species released during the reduction of the sulfated Fe/Al$_2$O$_3$ of example 7 (sulfation at 400° C.).
Figure 21:
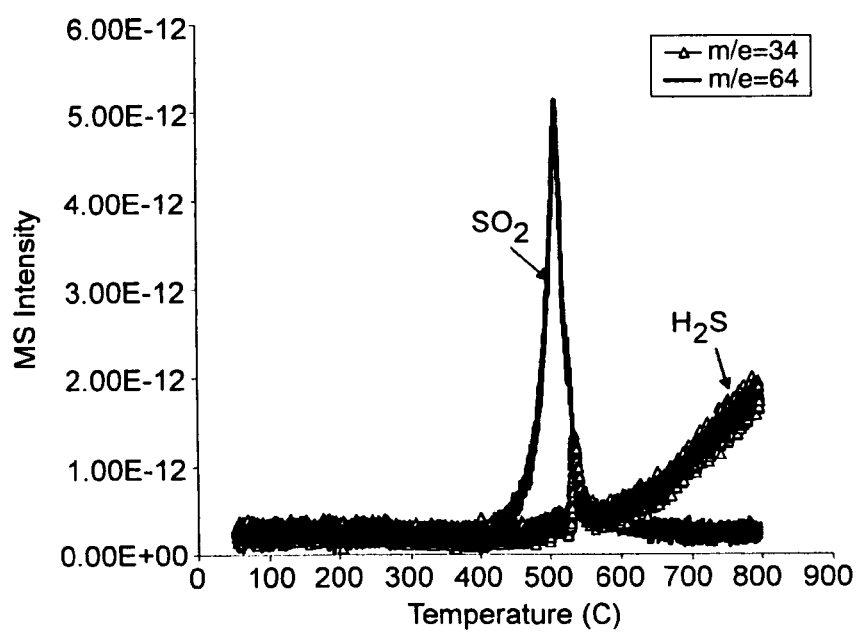
FIG. 21 depicts a graphical illustration of sulfur species released during the reduction of the sulfated Co/Al$_2$O$_3$ of example 6 (sulfation at 400° C.).
Figure 22:
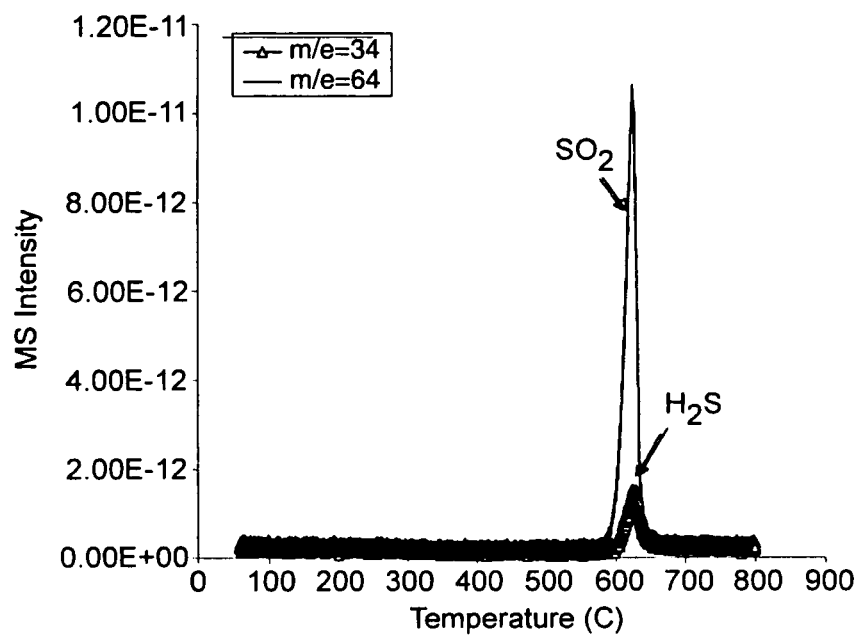
FIG. 22 depicts a graphical illustration of sulfur species released during the reduction of the sulfated Mn/Al$_2$O$_3$ of example 5 (sulfation at 400° C.).

FIG. 18 shows the first derivative of the weight loss (as determined by TGA) during reduction of metal sulfate (e.g., sulfation at 400° C.). As can be seen, different maxima of the weight loss are observed for different metal sulfate. For instance, the maximum temperature weight loss is observed at 300° C. for $Cu/Al_2O_3$, at 460° C. for $Fe/Al_2O_3$, at 520° C. for $Co/Al_2O_3$, and at 620° C. for $Mn/Al_2O_3$. The MS signal of the released sulfur species ($SO_2$: m/e=64 and $H_2S$: m/e=34) corresponding to this weight loss under $H_2$ are shown in FIGS. 19-22. As can be seen, the $SO_2$ was the major product of sulfur reduction. For $Cu/Al_2O_3$ sample, one can see two peaks of $SO_2$ release at 300° C. and 350° C. Also, the $H_2S$ desorption peak is observed at high temperature (>450° C.) (FIG. 19). For $Fe/Al_2O_3$, a single $SO_2$ desorption peak is observed at 460° C. and a complete desorption below 500° C. (FIG. 20). For $Co/Al_2O_3$, a single desorption peak for $SO_2$ is observed at max temperature of 520° C. (FIG. 21). In addition, $H_2S$ was also observed at high temperature (>600° C.). For $Mn/Al_2O_3$, the maximum $SO_2$ desorption peak can be seen at 625° C. with a complete desorption at temperature of 650° C. (FIG. 22).

Figure 23:
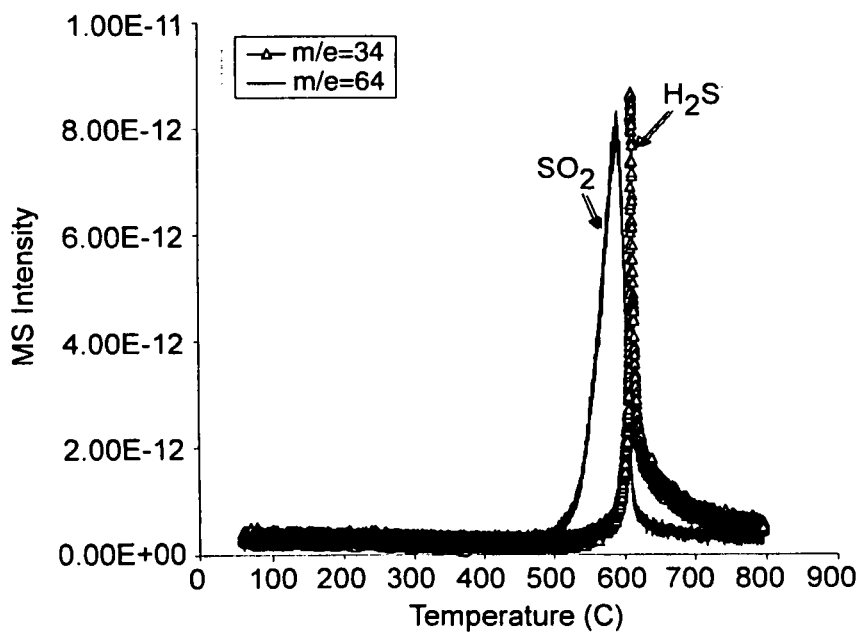
FIG. 23 depicts a graphical illustration of sulfur species released during the reduction of the sulfated Ce/Al$_2$O$_3$ of example 8 (sulfation at 200° C.).

The regeneration of sulfated $Ce/Al_2O_3$ of example 8 (sulfation at 200° C.) in 10% $H_2$ in He leads to two desorption peaks of $SO_2$ (at 580° C.) and $H_2S$ (at 630° C.) as shown in FIG. 23. With controlling the temperature below 600° C. it will be possible to avoid $H_2S$ emissions.

Figure 24:
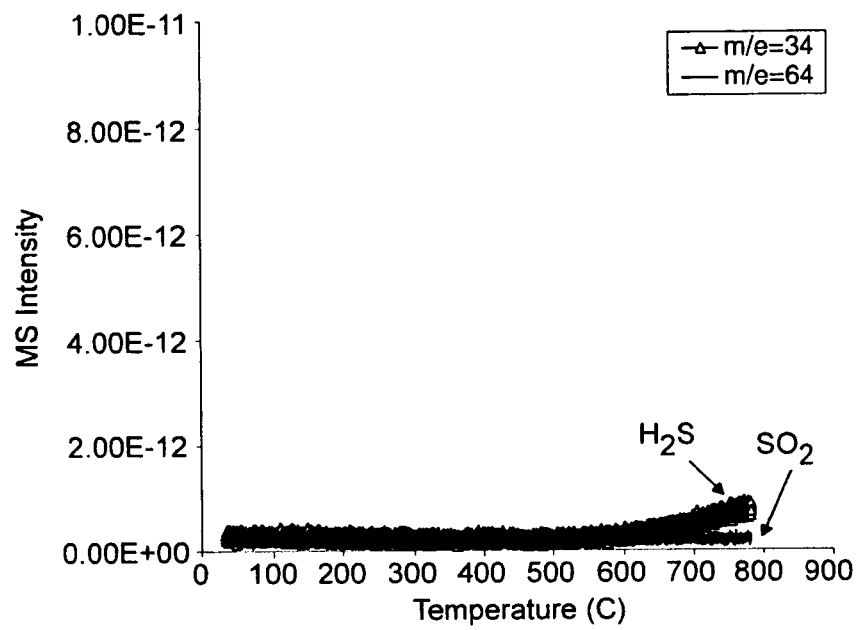
FIG. 24 depicts a graphical illustration of sulfur species released during the reduction of the sulfated Pt—Fe/Al$_2$O$_3$ of example 9 (sulfation at 400° C.).
Figure 25:
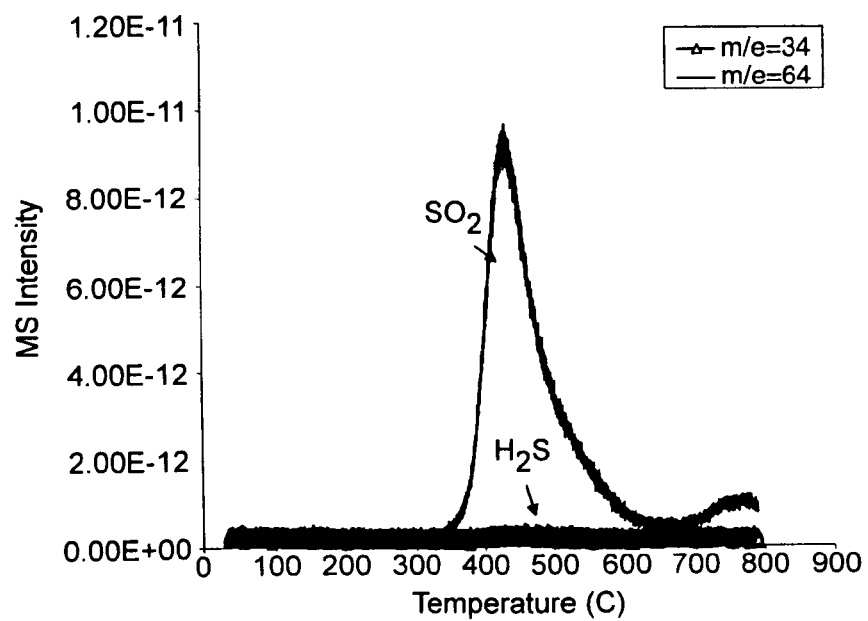
FIG. 25 depicts a graphical illustration of sulfur species released during the thermal decomposition in He of the sulfated Pt—Fe/Al$_2$O$_3$ of example 9 (sulfation at 400° C.).
Figure 26:
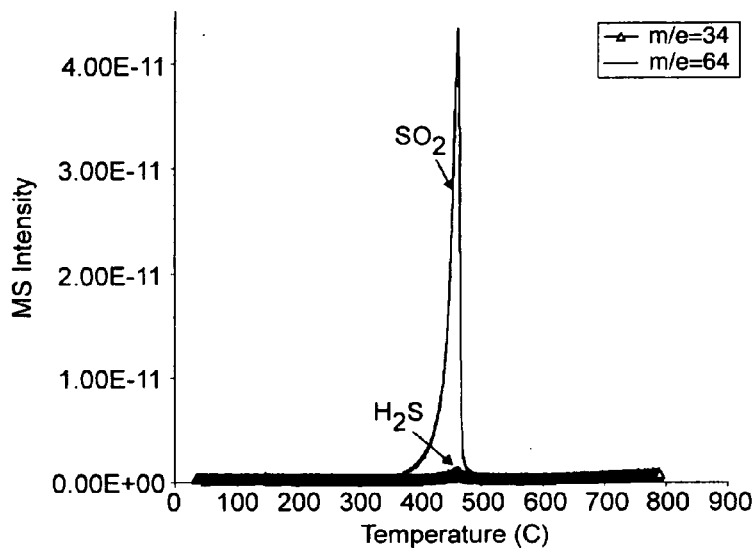
FIG. 26 depicts a graphical illustration of sulfur species released during the reduction of a sulfated Fe/Al$_2$O$_3$ of example 7 where an upstream Pt/Al$_2$O$_3$ of example 10 was used during sulfation (sulfation at 400° C.).
Figure 27:
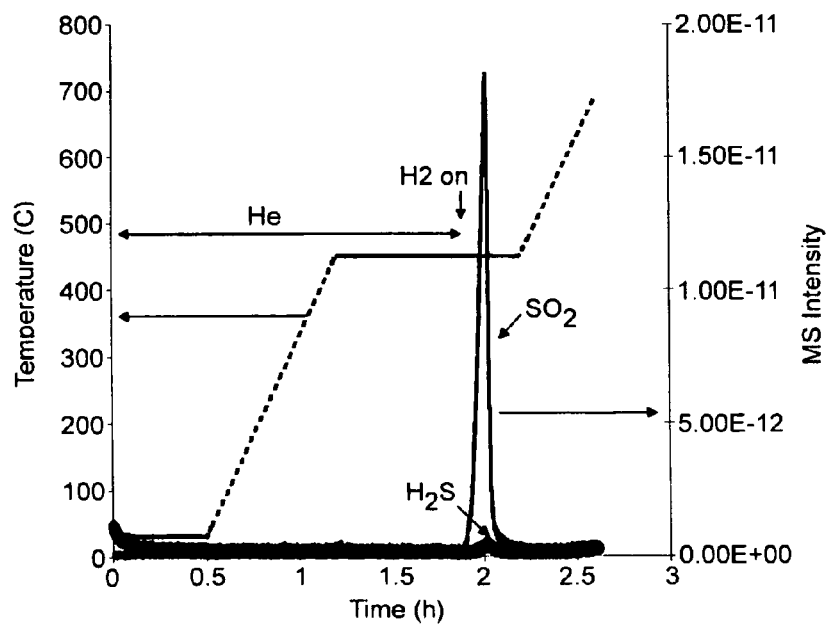
FIG. 27 depicts a graphical illustration of sulfur species released during isothermal reduction at 450° C. of a sulfated Fe/Al$_2$O$_3$ of example 7 where an upstream Pt/Al$_2$O$_3$ of example 10 was used during lean sulfation (sulfation at 400° C.).

The regeneration of the sulfated Pt—$Fe/Al_2O_3$ of example 9 (sulfation at 400° C.) under 10% $H_2$ in He shows no desorption of sulfur species at temperatures below 600° C. and only $H_2S$ is observed at temperature higher than 650° C. (FIG. 24). On the other hand, when $H_2$ is replaced with He, the sulfate decomposition from the sulfated sample occurs in the temperature range of 400-650° C. (FIG. 25). The sulfur is released mainly as $SO_2$. These results clearly indicate that under $H_2$ flow, the sulfur is retained on the catalyst. In the presence of Pt, the sulfate is reduced to $H_2S$ which then can react with iron to form stable iron sulfide (e.g., FeS). In conclusion, it is important to keep sulfur traps free from Pt. One way to take advantage of the Pt is to use it as an upstream oxidation catalyst with a downstream Pt free sulfur trap (layered catalysts) selected from Examples 4 through 7. In this case the oxidation of $SO_2$ to $SO_3$ occurs upstream of sulfur trap without influencing the desorption of sulfur species from sulfur traps. As typical examples, FIGS. 26-27 show sulfur species release from the sulfated $Fe/Al_2O_3$ catalyst (sulfation done with an upstream $Pt/Al_2O_3$ from Example 10). Only one desorption peak is observed at maximum temperature of 460° C. (FIG. 26). Also when an isothermal temperature was used (450° C.) a complete desorption of sulfur as $SO_2$ occurs and no sulfur desorption is observed when the temperature was increased from 450° C. to 700° C., indicative of complete sulfur desorption from iron at 450° C. (FIG. 27).

Figure 28:
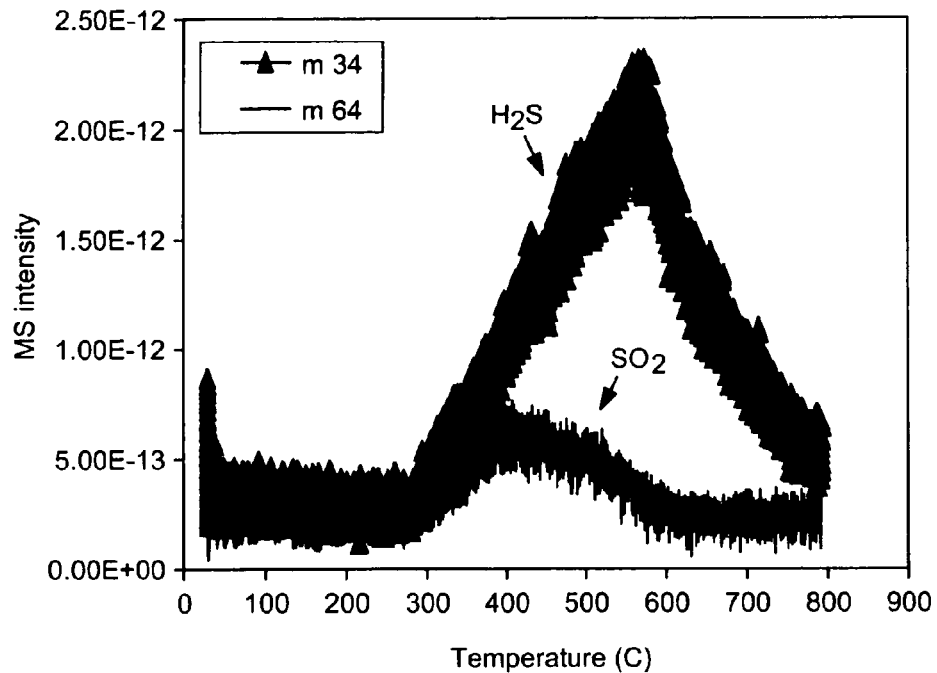
FIG. 28 depicts a graphical illustration of sulfur species desorption during the reduction of the sulfated Pt—Ba/Al$_2$O$_3$ (sulfation at 400° C.).

FIG. 28 shows sulfur species desorption from a sulfated Pt—$Ba/Al_2O_3$ of example 14 (catalyst sulfated at 400° C. using 30 ppm $SO_2$). As can be seen the sulfur desorption occurs at a broad temperature range with $H_2S$ as the main product. This is not a practical trap as it will require long regeneration period. In addition the emission of large $H_2S$ is not desired.

Figure 29:
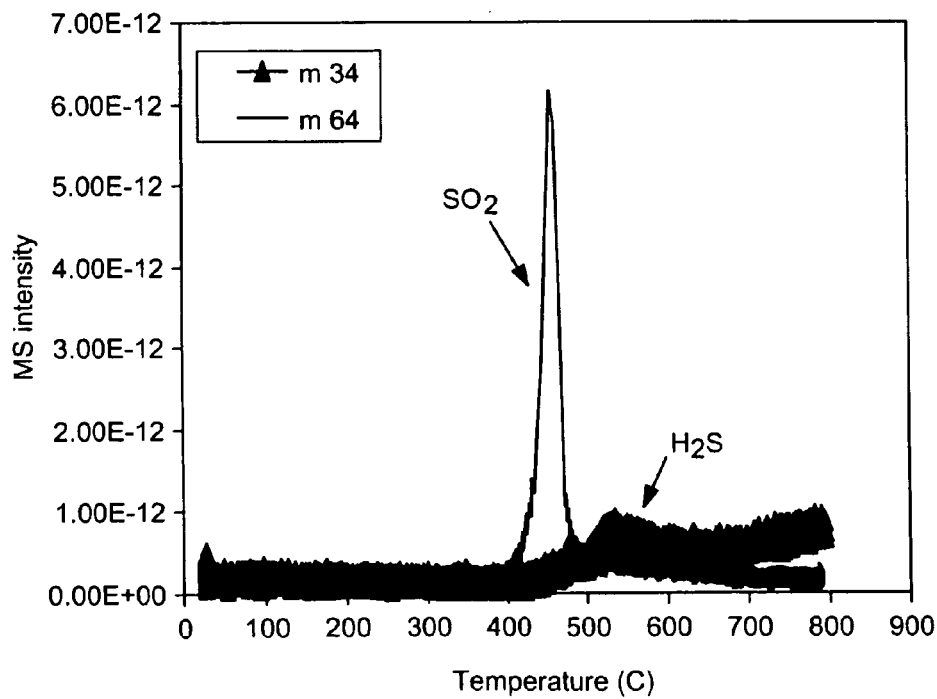
FIG. 29 depicts a graphical illustration of sulfur species desorption during the reduction of the sulfated Ce—Fe/Al$_2$O$_3$ (sulfation at 200° C.).

FIG. 29 shows sulfur species desorption from a sulfated Ce—$Fe/Al_2O_3$ of example 13 (catalyst sulfated at 200° C. using 30 ppm $SO_2$). As can be seen the sulfur desorption occurs mainly as $SO_2$ at 460° C. $H_2S$ forms at high temperatures. It is very important to point out that ceria addition improve significantly low temperature $SO_x$ adsorption.

Figure 30:
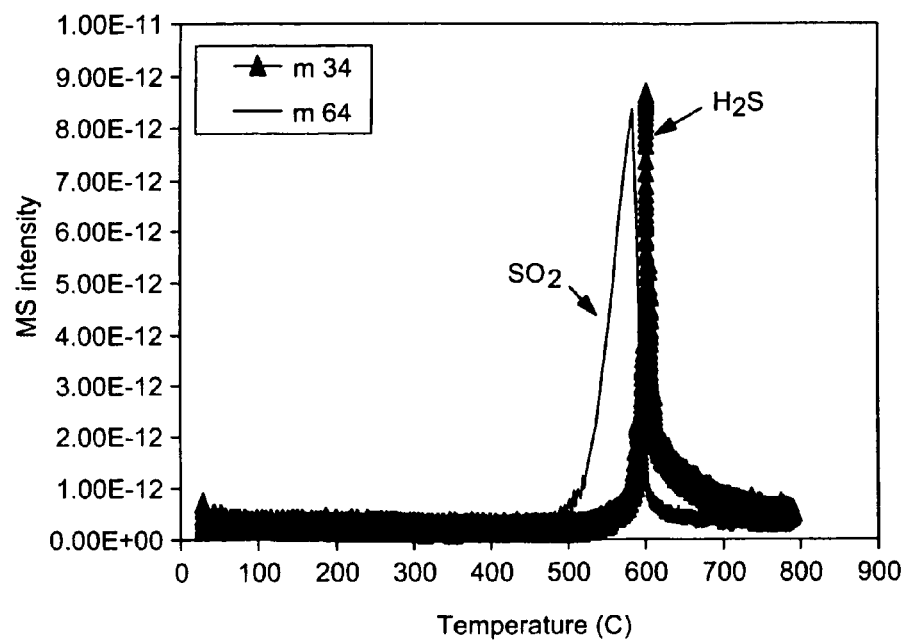
FIG. 30 depicts a graphical illustration of sulfur species desorption during the reduction of the sulfated Ce—Zr/Al$_2$O$_3$ (sulfation at 200° C.).

FIG. 30 shows sulfur species desorption from a sulfated Ce—$Zr/Al_2O_3$ of example 12 (catalyst sulfated at 200° C. using 30 ppm $SO_2$ for 24 hours). As can be seen the sulfur desorption occurs as a mixture of $SO_2$ and $H_2S$ in the temperature range of 500-650° C. It is very important to point out that ceria addition improve significantly low temperature $SO_x$ adsorption. The main issue is $H_2S$ releases at high temperatures.

Figure 31:
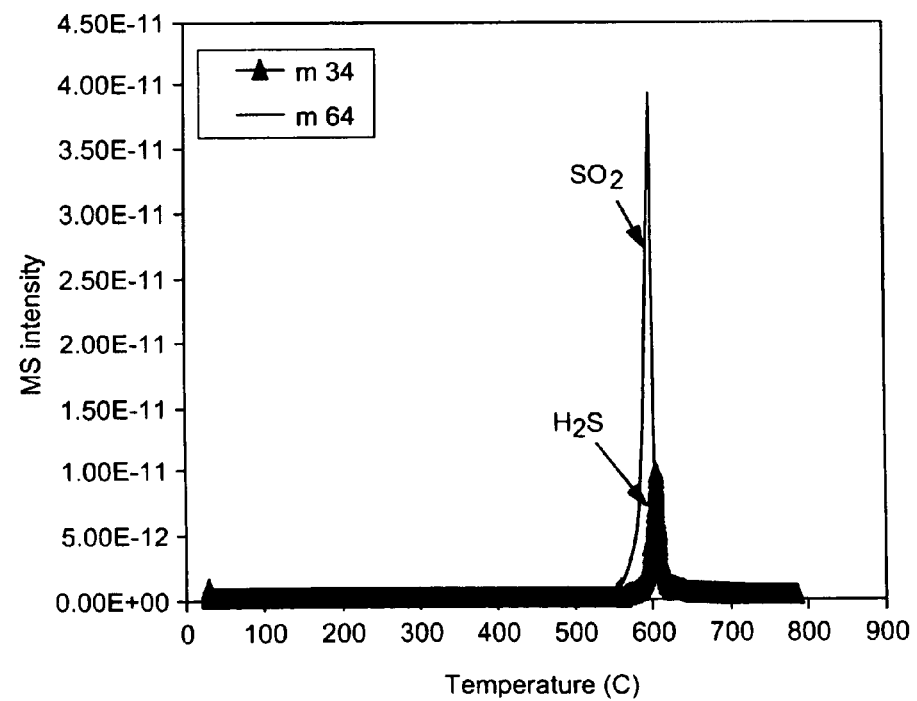
FIG. 31 depicts a graphical illustration of sulfur species desorption during the reduction of the sulfated Mn—La—Zr/Al$_2$O$_3$ from example 15 (sulfation at 200° C.).
Figure 32:
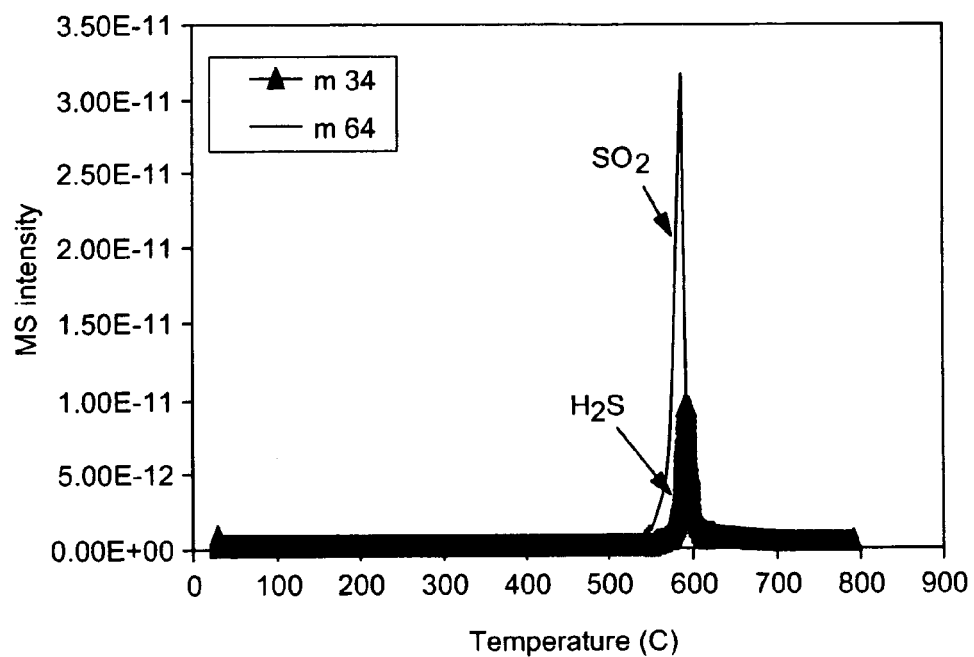
FIG. 32 depicts a graphical illustration of sulfur species desorption during the reduction of the sulfated Mn—La—Zr/Al$_2$O$_3$ from example 15 (sulfation at 400° C.).
Figure 33:
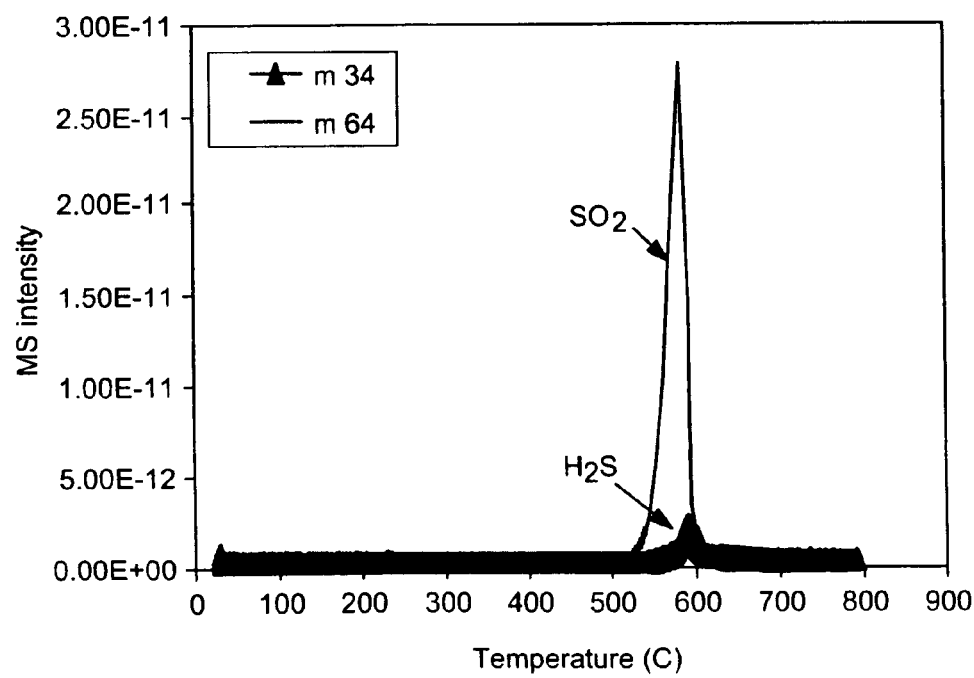
FIG. 33 depicts a graphical illustration of sulfur species desorption during the reduction of the sulfated Mn—La—Zr/Al$_2$O$_3$ from example 16 (sulfation at 200° C.).
Figure 34:
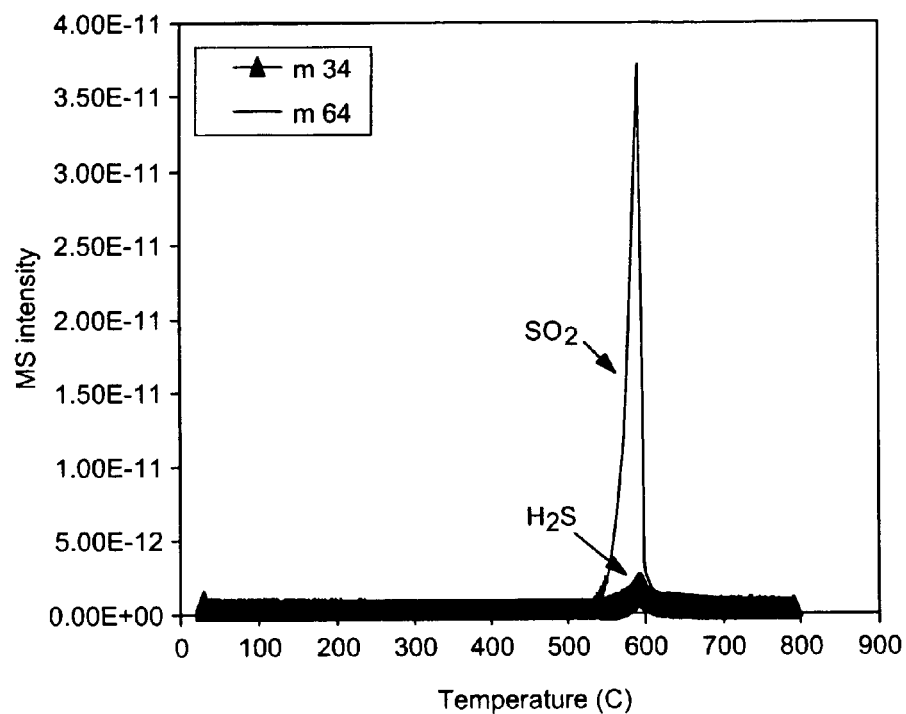
FIG. 34 depicts a graphical illustration of sulfur species desorption during the reduction of the sulfated Mn—La—Zr/Al$_2$O$_3$ from example 16 (sulfation at 400° C.).

Metal oxide based on Mn—La—Zr formulations (examples 15 through 20) show excellent $SO_x$ adsorption at a broad temperature window (200-500° C.). As a typical example FIGS. 31 and 32 show $SO_x$ desorption from a sulfated Mn—La—Zr of example 15 (catalyst sulfated using 300 ppm $SO_2$ at 200° C.: FIG. 31 and at 400° C.: FIG. 32). As can be seen sulfur is released mainly as $SO_2$. In both cases the total sulfur retained on the catalyst was around 2 wt % indicating that the system is efficient in trapping $SO_x$ at 200° C. and 400° C. Similar results were obtained with other formulations. For instance, Mn—La—Zr of example 16 sulfated at 200° C. (FIG. 33) or at 400° C. (FIG. 34) shows again that during regeneration sulfur is mainly released as $SO_2$ at 600° C.

Durability of $SO_x$ Traps:

The as prepared $SO_x$ traps were first steamed at 600° C. for 24 hrs in a bench flow reactor with simulated exhaust gas. The simulated exhaust gas contained 10% $H_2O$, 9% $O_2$, the balance He. Then the steamed $SO_x$ traps were sulfated and regenerated at the desired temperature. The process of sulfation/ regeneration was then repeated for many cycles. Table 1 shows sulfur capacity of selected $SO_x$ traps before and after aging (steaming followed by multiple cycle of regeneration/sulfation). The first trap was $Fe/Al_2O_3$ of example 7 in combination with an upstream $Pt/Al_2O_3$ catalyst of example 10 and the second trap was Mn—La—Zr trap. The sulfation for both system was done at 400° C. (with 300 ppm $SO_2$+5% $H_2O$+5% $CO_2$ and 10% $O_2$, the balance helium for 2 hours) while the regeneration (with 10% $H_2$+5% $CO_2$+5% $H_2O$+He for 20 min) was done at different temperatures. For $Fe/Al_2O_3$ the regeneration was done at 500° C. while with Mn—La—Zr the regeneration was done at 600° C. As can be seen from Table 2 only minor capacity loss was observed after multiple cycles of regeneration/sulfation. Fresh steamed $Fe/Al_2O_3$ adsorbs 1.9 Wt-% S and after 100 cycles (about 100,000 miles) of regeneration/sulfation the catalyst adsorbs about 1.7 wt-% S indicating minor trapping efficiency loss (about 10%). On the other hand, a fresh steamed Mn—La—Zr sulfur capacity was 2.0 wt-% S and after 6 cycles of regeneration/sulfation the trap capacity was 1.9 wt-% S. It is very important to point out that these traps are fully regenerated and $SO_2$ was the main product.

TABLE 2

Durability of selected SOx traps after multiple cycles of regeneration/sulfation

| $SO_x$ traps | S capacity after steaming (Wt-% S) | S capacity after multiple cycles of regen/sulfation (Wt-% S) | Cycle of regen/sulfation |
|---|---|---|---|
| $Fe/Al_2O_3$* (example 2) | 1.9 | 1.7 | 100 cycles (100,000 miles)** |
| Mn—La—Zr (example 11) | 2.0 | 1.9 | 6 cycles*** (6,000 miles)** |

Figure 35:
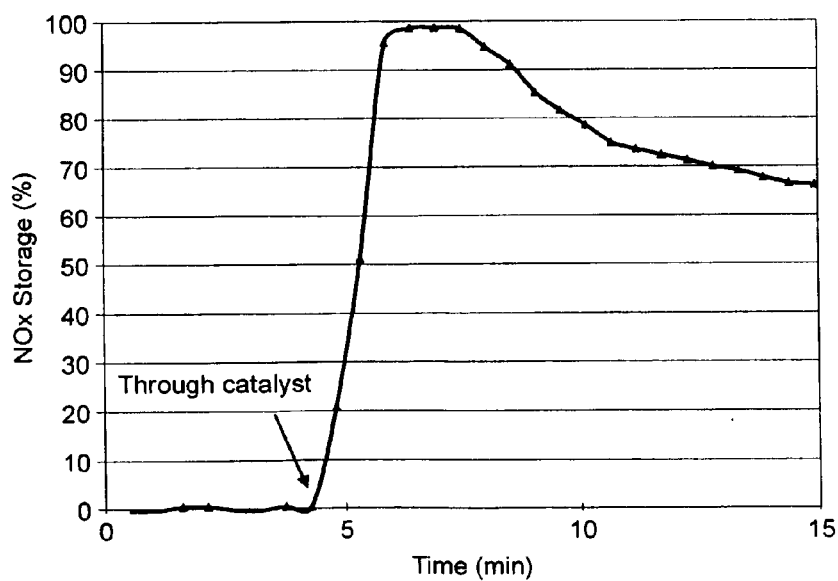
FIG. 35 depicts NO$_x$ storage efficiency under lean conditions and in the presence of small amount of H$_2$ using the Ag/Al$_2$O$_3$ catalyst of example 11.

*Pt/Alumina of example 10 was used in an upstream position of Fe/Al2O3 (layered catalyst)
**Miles calculated based on 15 ppm S fuel
***Number of cycles set by time available for testing not by an observed limitation In summary, $Cu/Al_2O_3$ and $Fe/Al_2O_3 SO_x$ trap systems are excellent candidates for low temperature regeneration. Both systems release sulfur mainly as $SO_2$ with a full regeneration below 400° C. for $Cu/Al_2O_3$ and 450° C. for $Fe/Al_2O_3$. It is important to note that Pt-containing catalyst (e.g. $Pt/Al_2O_3$) is needed to improve low temperature (<350° C.) $SO_x$ trapping efficiency of Fe and Cu-containing catalysts. $Pt/Al_2O_3$ enhances $SO_2$ oxidation to $SO_3$ and thus $SO_x$ trapping efficiency. On the other hand, the use of an upstream oxidation catalyst will also improve $NO_x$ storage efficiency of NSR catalyst because of the oxidation of NO to $NO_2$. Another other option is to use Ag as part of the $SO_x$ trap or NSR catalyst formulations to enhance both NO and $SO_2$ oxidation. However, with Ag-containing catalyst a small concentration of $H_2$ is needed during lean condition. As a typical example, FIG. 35 shows high $NO_x$ storage capacity over $Ag/Al_2O_3$ catalyst when feeding 500 ppm $NO$+2000 ppm $H_2$+9% $CO_2$+5% $H_2O$ at a temperature of 200° C. and a GHSV of 30,000 $h^{-1}$. About 98% $NO_x$ storage efficiency is obtained within a 1 minute period. The $NO_x$ are stored as nitrates on both Ag and Alumina support sites. It's very important to mention that a small amount of $H_2$ is needed to reach this high $NO_x$ storage because under such condition Ag will enhance NO oxidation to $NO_2$.

Figure 36:
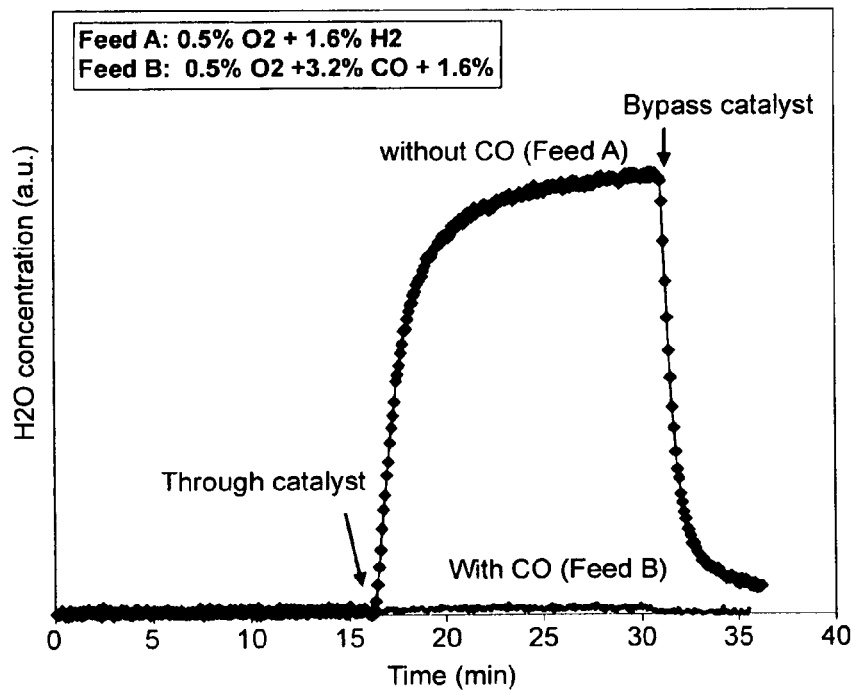
FIG. 36 depicts H$_2$ oxidation with O$_2$ under rich conditions in presence and in absence of CO over the Pt/Al$_2$O$_3$ catalyst of example 10.

Other findings associated with the $Pt/Al_2O_3$ oxidation catalyst of example 10 is the ability of this catalyst to oxidize selectively CO while $H_2$ oxidation did not take place when a rich feed contains a residual concentration of $O_2$ (about 0.5 volume %). This is an important finding because $H_2$ is needed downstream of the oxidation catalyst for NSR catalyst protection from sulfur poisoning. As an illustration, FIG. 36 shows the oxidation of $H_2$ to $H_2O$ in presence and in the absence of CO under a rich condition containing 0.5% $O_2$. As can be seen in the absence of CO, $H_2$ is oxidized to $H_2O$. On the other hand, in presence of CO, no water is detected in line with no oxidation of $H_2$. The $Pt/Al_2O_3$ catalyst oxidizes selectively CO.

For Ce and Mn containing SOx traps were found to trap efficiently $SO_x$ at a broad temperature window (200-500° C.) and an upstream oxidation catalyst is not needed. In the case of Ceria-containing formulations were found to release sulfur as a mixture of $SO_2$ and $H_2S$. On the other hand, Mn-containing formulation (e.g. Mn—La—Zr mixed metal oxides) releases sulfur mainly as SO2 with a full regeneration at 600° C. These traps are excellent candidates for high temperature application.

For exhaust automobile application these $SO_x$ trap materials can be provided on a separate substrate such as a flow-through honeycomb monolith. The monolith can be metal or ceramic, where ceramic it can be cordierite, although alumina, mulitte, silicon carbide, zirconia are alternatives. Manufacture of coated substrate can be carried out by methods known to the skilled in the art and no further explanation will be given here.

Examples 22-23

Water Gas Shift Catalyst Preparation and Pretreatment for $CeO_2$—$ZrO_2$ Supports 2.6% $CeO_2$—$ZrO_2$ Sample (Example 22).

Five hundred grams of $ZrOCl_2.8H_2O$ and fourteen grams of $Ce(SO_4)_2$ were dissolved while stirring in 3.0 liters of distilled water. Another solution containing 260 grams of concentrated $NH_4OH$ and 3.0 liters of distilled water was prepared. These two solutions were combined at the rate of 50 ml/min using a nozzle for mixing. The pH of the final composite was adjusted to approximately 8 by the addition of concentrated ammonium hydroxide. This slurry was then put in polypropylene bottles and placed in a steambox (100° C.) for 72 hours. The product formed was recovered by filtration, washed with excess water, and stored as a filtercake. The filtercake was dried overnight at 100° C. Thereafter a portion of the dried filtercake was calcined at 700° C. for a total of 3 hours in flowing air and then allowed to cool. The cerium content was 2.6%. Sample nomenclature was 2.6% $CeO_2$—$ZrO_2$.

17.65% $CeO_2$—$ZrO_2$ Sample (Example 23).

Five hundred grams of $ZrOCl_2.8H_2O$ and one hundred and forty grams of $Ce(SO_4)_2$ were dissolved while stirring in 3.0 liters of distilled water. Another solution containing 260 grams of concentrated $NH_4OH$ and 3.0 liters of distilled water was prepared. These two solutions were combined at the rate of 50 ml/min using nozzle mixing. The pH of the final composite was adjusted to approximately 8 by the addition of concentrated ammonium hydroxide. This slurry was then put in polypropylene bottles and placed in a steambox (100° C.) for 72 hours. The product formed was recovered by filtration, washed with excess water, and stored as a filtercake. The filtercake was dried overnight at 100° C. Thereafter a portion of the filtercake was calcined at 700° C. for a total of 3 hours in flowing air. The cerium content was 17.6%. Sample nomenclature was 17.65% $CeO_2$—ZrO2.

Testing of the WGS was done using stainless steel laboratory microreactors. The catalyst (25-30 mesh size) was loaded in the reactor and then reduced in 4% $H_2$ in helium at 400° C. for 2 hours before the WGS reaction. Water was then fed to the evaporator (at 120° C.). Then mixed in the evaporator with the carbon monoxide (CO) and nitrogen ($N_2$) feed gas. The gas mixture passed into the fixed bed laboratory microreactor via heated lines (110° C.). Gaseous products ($CO_2$, $H_2$) from the reactor were quantified using the thermal conductivity detector (TCD) of a Hewlett Packard 6890 gas chromatograph. The gas mixture consisting of the following: CO=4%, $H_2O$=17% and a total flow rate such that the GHSV=14,638 $h^{-1}$.

$CeO_2$—$ZrO_2$ catalysts were inactive for the WGS reaction in the temperature range of 150-450° C.

Examples 24 and 25

Water Gas Shift Catalyst Preparation for Pt Supported on $CeO_2$—$ZrO_2$ 2.6% $CeO_2$—$ZrO_2$ and 17.6% $CeO_2$—$ZrO_2$ supports prepared in Example 22 and 23 were loaded with Pt as follows: 51 mg of the tetraammineplatine (II) chloride hydrate was dissolved in 30 ml of water, and then 3 g of the $CeO_2$—$ZrO_2$ were added. The mixture was stirred for 4 hours. The pH of the solution was 2.41 with the 2.6% $CeO_2$—$ZrO_2$ while this value reached 2.83 when 17.6% $CeO_2$—$ZrO_2$ was used. The excess solution was removed by heating at 90° C. while stirring. After drying in an oven overnight the solids were calcined at 400° C. for 4 hours in air. The Pt loading in the samples was 1 wt %.

Figure 37:
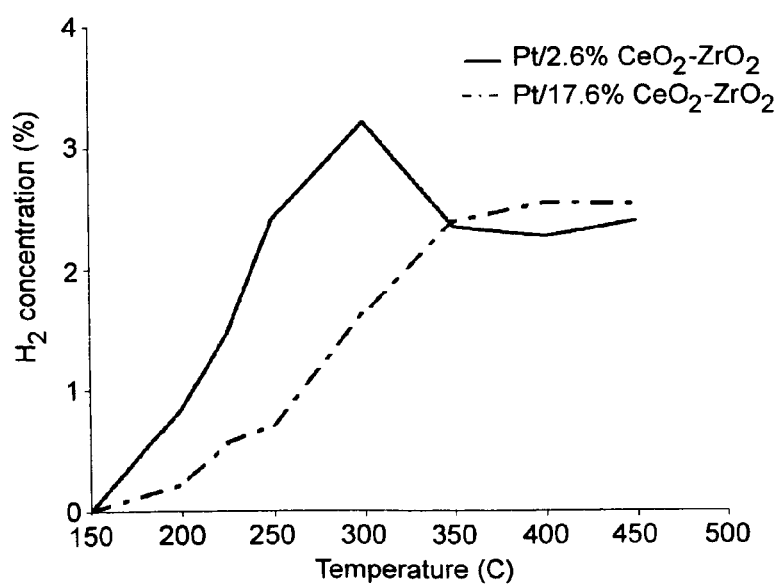
FIG. 37 depicts a graphical illustration of hydrogen concentration versus temperature and Ce loading on the water gas shift reaction over Rh supported CeO$_2$—ZrO$_2$ for a feed of 4% CO+17% H$_2$O at GHSV=14,683 h$^{-1}$.
Figure 38:
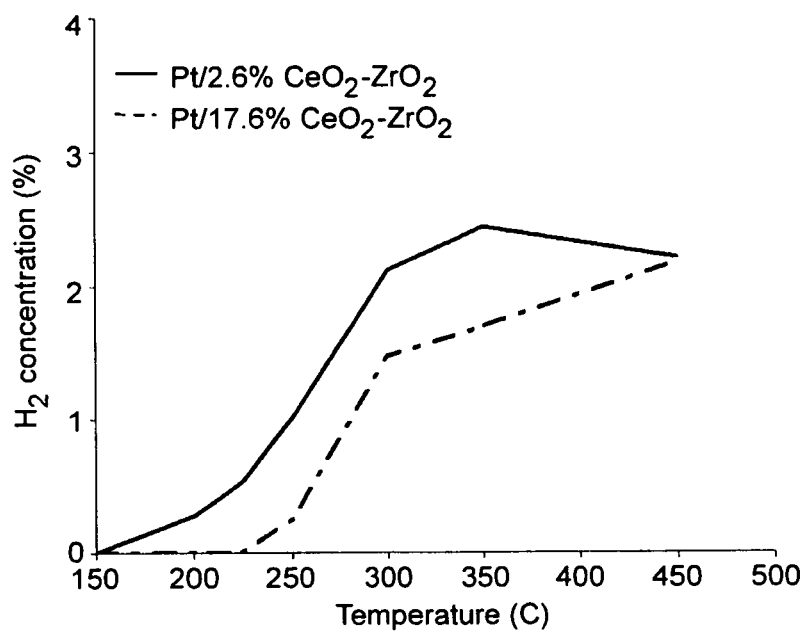
FIG. 38 depicts a graphical illustration of hydrogen concentration versus temperature and Ce loading on the water gas shift reaction over Pt supported CeO$_2$—ZrO$_2$ for a feed of 4% CO+17% H$_2$O at GHSV=73,194 h$^{-1}$.

The Pt/2.6% $CeO_2$—$ZrO_2$ (Example 24) and Pt/17.6% $CeO_2$—$ZrO_2$ (Example 25) were reduced at 400° C. in 4% $H_2$ in He then tested for their WGS performance at different temperatures and a total flow rate such that the GHSV 14, 638 $h^{-1}$ (FIG. 37), or at a GHSV of 73, 194 $h^{-1}$ (FIG. 38). As can be seen, from FIGS. 37 and 38 the catalysts are active at a broad temperature window. At the temperature below 350° C., Pt/2.6% $CeO_2$—$ZrO_2$ shows a high $H_2$ production than the Pt/17.6% $CeO_2$—$ZrO_2$ indicating the importance of cerium loading in controlling the acidity of the support and Pt dispersion. Increasing the GHSV lead to a decrease in the WGS activity in both catalysts. At the temperature of interest to our application (e.g., 450° C.), the $H_2$ produced is in the range 2.3-2.6% with a CO conversion in the range of 60-70%.

Examples 26 and 27

Water Gas Shift Catalyst Preparation and Testing of Rh Supported on $CeO_2$—$ZrO_2$ Catalysts 2.6% $CeO_2$—$ZrO_2$ and 17.6% $CeO_2$—$ZrO_2$ supports prepared in Examples 22-23 were loaded with Rh as follows: 37.5 mg of Rhodium (III) trichloride were dissolved in 30 ml water then 3 g of the $CeO_2$—$ZrO_2$ were added. The mixture was stirred for 4 hours. The pH of the solution was 2.25 with the 2.6% $CeO_2$—$ZrO_2$ (Example 22), and this value reached 2.58 when 17.6% $CeO_2$—$ZrO_2$ (Example 23) was used. The excess solution was removed by heating at 90° C. while stirring. After drying at 80° C. in an oven overnight, the solid was calcined at 400° C. for 4 hours in air. The Rh loading in the samples was 0.5 wt %.

Figure 39:
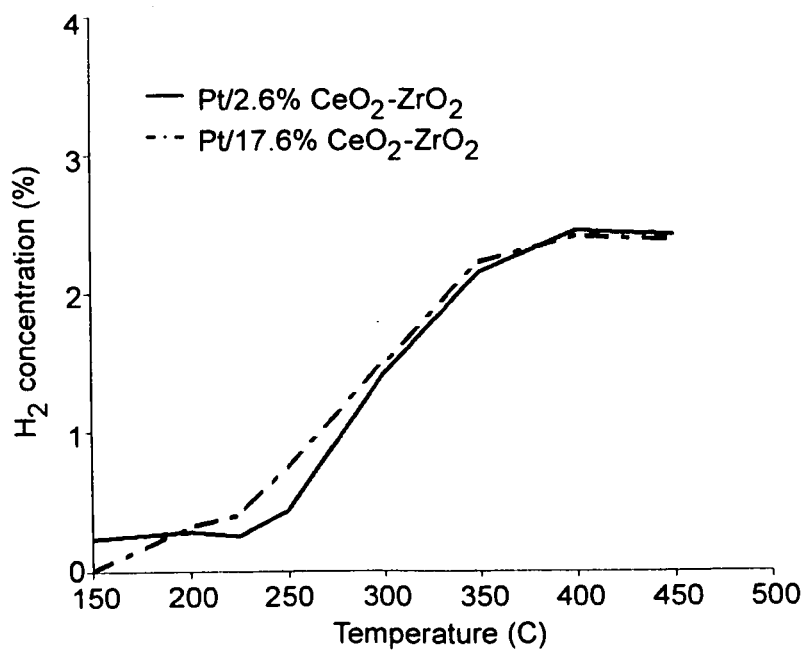
FIG. 39 depicts a graphical illustration of hydrogen concentration versus temperature and Ce loading on the water gas shift reaction over Rh supported CeO$_2$—ZrO$_2$ for a feed of 4% CO+17% H$_2$O at GHSV=14,683 h$^{-1}$.

The as prepared catalysts were reduced in 4% $H_2$ in He at 400° C. then tested for their WGS performance in a gas mixture consisting of: CO=4%, 17% $H_2O$ and a total flow rate such that the GHSV=14,638 $h^{-1}$ (FIG. 39). As can be seen, both catalysts show comparable activity with a maximum $H_2$ concentration at around 2.5% at 450° C. and with a CO conversion of 70%.

The WGS catalyst can be provided on a separate substrate such as a flow-through honeycomb monolith. The monolith can be metal or ceramic, where ceramic it can be cordierite, although alumina, mullite, silicon carbide, zirconia are alternatives. Manufacture of coated substrate can be carried out by methods known to the skilled in the art and no further explanation will be given here. In other embodiment the WGS components can be included in NSR catalyst trap formulation. Also, the WGS components can be layered with the NSR components on the same monolith.

Examples 28 and 29

Figure 40:
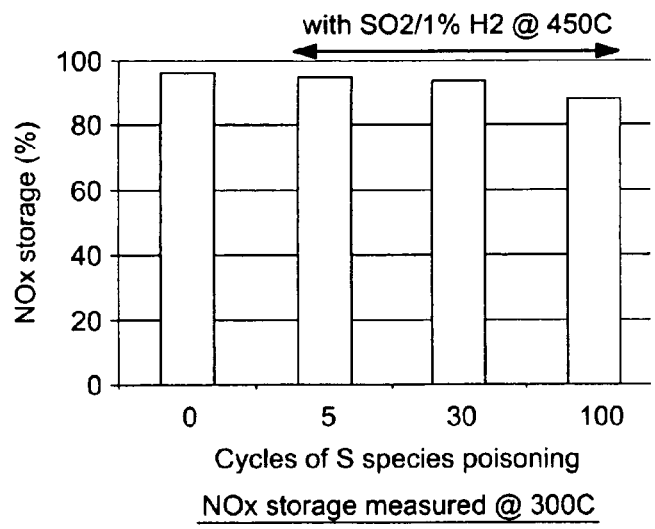
FIG. 40 depicts a graphical illustration of average NO$_x$ storage (1 min average, Feed 4) at 300° C. over a NSR catalyst trap following different cycles of SO$_2$ poisoning under simulated rich conditions containing H$_2$ (Feed 2b, Table 1) and oxidation (Feed 3, Table 1) at 450° C. of the adsorbed SO$_2$ between each cycle. The GHSV was 30,000 h$^{-1}$.
Figure 41:
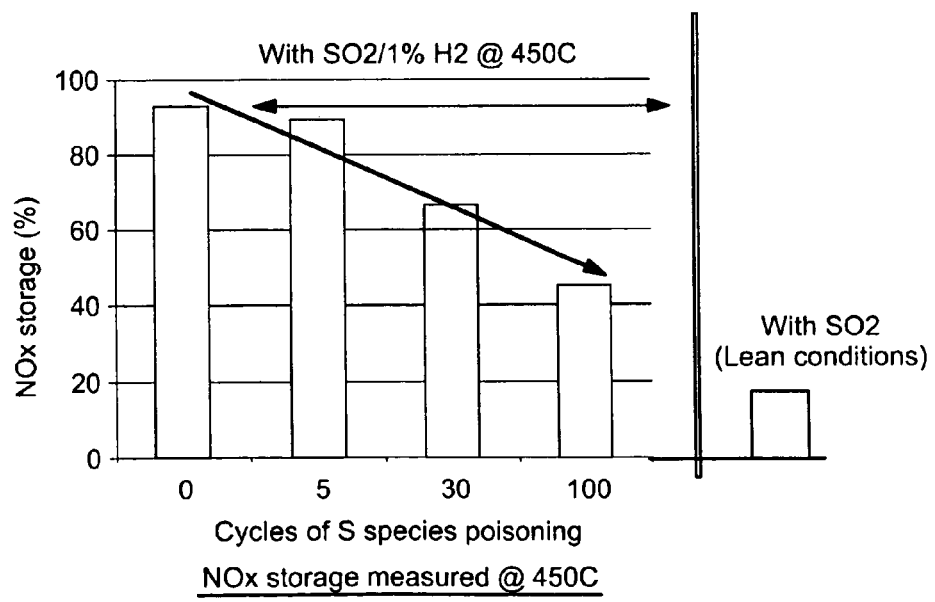
FIG. 41 depicts a graphical illustration of average NO$_x$ storage (1 min average, Feed 4) at 450° C. over a NSR catalyst trap following different cycles of SO$_2$ poisoning under simulated rich conditions containing H$_2$ (Feed 2b, Table 1) and oxidation (Feed 3, Table 1) at 450° C. of the adsorbed SO$_2$ between each cycle. The GHSV was 30,000 h$^{-1}$. Average NO$_x$ storage after 1 cycle SO$_2$ poisoning under lean conditions (feed 3 with 90 ppm SO$_2$) is also reported.

Durability of NSR Catalyst after Multiple Cycles of Sulfur Poisoning Under $H_2$ Rich Conditions FIGS. 40 and 41 depict the $NO_x$ storage efficiency (Feed 4, Table 1) measured at 300° C. (FIG. 40) and 450° C. (FIG. 41) over a NSR catalyst after multiple cycle of $SO_2$ poisoning under $H_2$ rich conditions at 450° C. for 20 min. (feed 2b, table 1). As can be seen, a high $NO_x$ storage efficiency (Average $NO_x$ storage $\geq$90% for 1 min period) is measured even after 100 cycles of $SO_2$ poisoning (FIG. 40) indicating that passing $SO_2$ through NSR catalyst does not affect low temperature $NO_x$ storage sites (e.g. $BaCO_3$) in line with minimal poisoning of these sites. On the other hand, the measured $NO_x$ storage at 450° C. (FIG. 41) decreases by about 50% after 100 cycles of $SO_2$ poisoning indicating that a part of storage sites responsible for high temperature $NO_x$ adsorption are partially poisoned by sulfur. It is very important to mention that 1 cycle poisoning by $SO_2$ under lean conditions at 450° C. for 20 min. using a similar amount of $SO_2$ (feed 3 with 90 ppm $SO_2$, Table 1) leads to a loss of more than 80% $NO_x$ storage efficiency (measured average $NO_x$ storage for 1 min, was only 18%, FIG. 41). It is clear from this study that for sulfur trap to be a feasible system for NSR catalyst protection a number of critical parameters need to be controlled, which are as follows: (1) Temperature around NSR catalyst during sulfur species release from $SO_x$ trap which needs to be controlled at a temperature window from about 400 to 575° C., or 425 to 550° C., or 450 to 500° C., (2) molar ratio of $H_2$ to sulfur species (e.g. this ratio need to be close to about 50 and higher, or 60 and higher, or 80 and higher, or 100 and higher at a temperature of 450° C., and (3) the nature of $NO_x$ storage sites (e.g. keep barium sites as $BaCO_3$ and avoid the formation of $Ba(OH)_2$/BaO) and the spacing between $SO_x$ trap and NSR catalyst because it will affect the temperature around NSR catalyst. An external unit to control the temperature window around NSR catalyst may be optionally added if necessary. Regarding the molar ratio of $H_2$ to sulfur species, when higher temperatures are used, this ratio may decrease. For example, at a temperature of 500° C., the ratio may be 20 and higher, or 30 and higher, or 40 and higher, or 50 and higher. In another example, at a temperature of 600° C., the ratio may be 10 and higher, or 20 and higher, or 30 and higher, or 40 and higher.

What is claimed is:

1. A regenerable sulfur oxides trap catalyst product composition containing adsorbed sulfur and made according to a process comprising:
providing a fresh or regenerated sulfur oxides trap catalyst composition comprising a Mn—La—Zr oxide on a catalyst support (S), wherein the catalyst support (S) is selected from the group consisting of alumina, stabilized gamma alumina with rare earth components, MCM-41, zeolites, silica, magnesia, zirconia, ceria, ceria-zirconia, titania, titania-zirconia, and combinations thereof;

exposing the sulfur oxides trap catalyst composition to a combustion source containing $SO_x$ under lean exhaust conditions sufficient for the sulfur oxides trap catalyst to adsorb the $SO_x$ by converting a Mn—La—Zr oxide site into a Mn—La—Zr sulfate, the conditions comprising an adsorption temperature from 200° C. to 600° C. and an oxidative environment, thus forming a regenerable sulfur oxides trap catalyst product composition containing adsorbed sulfur, wherein at least one of the following are satisfied:
the Mn—La—Zr oxide comprises from 1 wt % to 25 wt % Mn, from 1 wt % to 10 wt % La, from 20 wt % to 60 wt % Zr, and the remaining wt % oxygen;
the Mn—La—Zr oxide further comprises yttrium, cerium, lithium, potassium, or combinations thereof; and
the Mn—La—Zr oxide is supported on alumina in an amount from 5 wt % to 90 wt %.

2. The regenerable sulfur oxides trap catalyst product composition of claim 1, wherein the catalyst support (S) is alumina or stabilized gamma alumina with rare earth components.

3. The regenerable sulfur oxides trap catalyst product composition of claim 1, wherein the catalyst support (S) has a surface area of from 10 to 1000 $m^2/g$.

4. The regenerable sulfur oxides trap catalyst product composition of claim 3, wherein the Mn—La—Zr oxide has a surface area from 10 $m^2/g$ to 1000 $m^2/g$.

5. The regenerable sulfur oxides trap catalyst product composition of claim 3, wherein the catalyst support (S) has a sample surface area from 50 $m^2/g$ to 500 $m^2g$.

* * * * *